(12) United States Patent
Joder et al.

(10) Patent No.: US 10,173,266 B2
(45) Date of Patent: Jan. 8, 2019

(54) METHOD AND APPARATUS FOR INSERTING AND REMOVING A DIFFERENTIAL CASE CUTTER

(71) Applicant: Dana Automotive Systems Group, LLC, Maumee, OH (US)

(72) Inventors: Wayne C. Joder, Maumee, OH (US); Jared Sparks, Columbia City, IN (US); Steven W. Thomas, Huntington, IN (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 105 days.

(21) Appl. No.: 15/459,601

(22) Filed: Mar. 15, 2017

(65) Prior Publication Data

US 2017/0266731 A1    Sep. 21, 2017

Related U.S. Application Data

(60) Provisional application No. 62/308,538, filed on Mar. 15, 2016.

(51) Int. Cl.
  *B23B 3/24*   (2006.01)
  *B23B 29/02*  (2006.01)
  *B23B 29/03*  (2006.01)

(52) U.S. Cl.
  CPC ............... *B23B 3/24* (2013.01); *B23B 29/02* (2013.01); *B23B 29/03* (2013.01)

(58) Field of Classification Search
  CPC ............ B23B 3/24; B23B 29/02; B23B 29/04
  See application file for complete search history.

(56) References Cited

U.S. PATENT DOCUMENTS

| | | |
|---|---|---|
| 4,296,658 A | 10/1981 | Champeau et al. |
| 5,086,676 A | 2/1992 | Gifford et al. |
| 6,183,404 B1 | 2/2001 | Deufel |
| 7,096,563 B2 | 8/2006 | Walz |
| 7,422,398 B2 | 9/2008 | Wirtanen et al. |
| 7,721,398 B2 | 5/2010 | Bernhard et al. |
| 8,479,621 B2 | 7/2013 | Suzuyama et al. |

*Primary Examiner* — Alan Snyder
(74) *Attorney, Agent, or Firm* — Marshall & Melhorn, LLC

(57) ABSTRACT

A method and apparatus for machining an internal surface of a differential case. A lathe having a turret and a pair of spindles are in electrical communication with a programmable computer. Integrally connected to the turret is a cutter gripper assembly that is selectively grippingly engageable with a cutter. A differential case is mounted horizontally within a mount assembly on a tabletop of the lathe. Once the cutter gripping assembly engages the cutter, the turret moves toward the differential case until the cutter is in a start position within the hollow portion of the case aligned with openings in a first and second tubular portion of the case and the pair of spindles. The pair of spindles then drivingly engage the cutter and the cutter machines a first and second internal machining surface as the cutter moves from a first cutting position to a second cutting position.

23 Claims, 21 Drawing Sheets

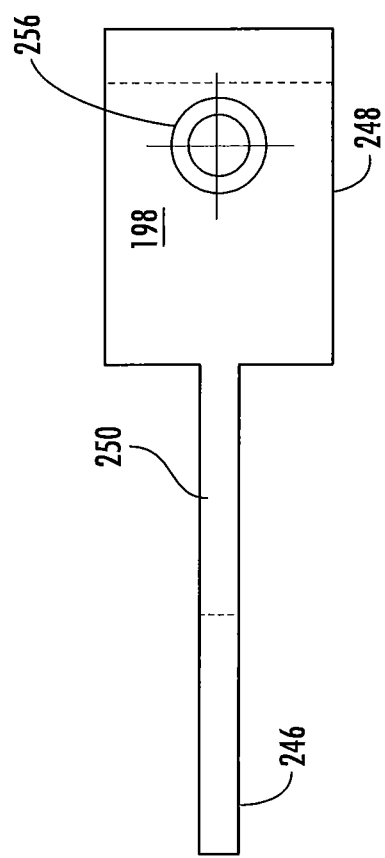
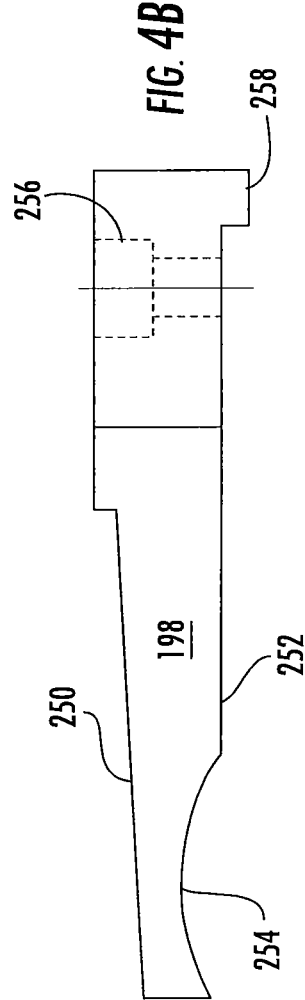

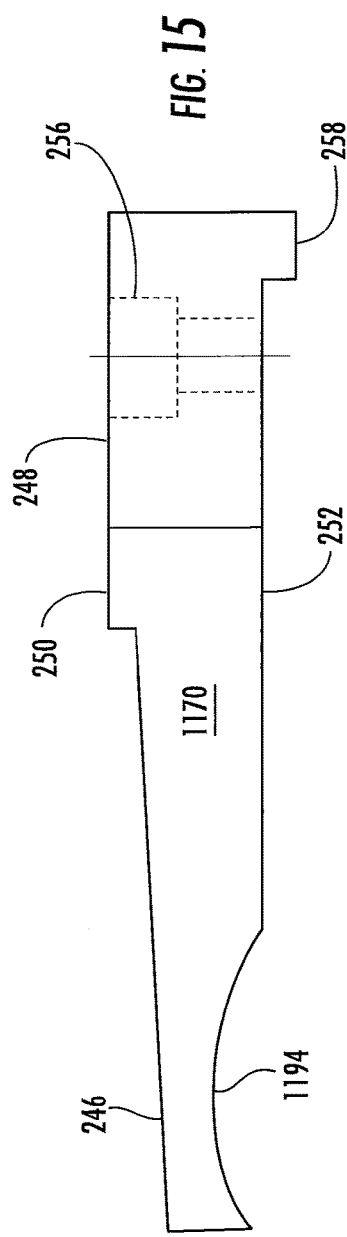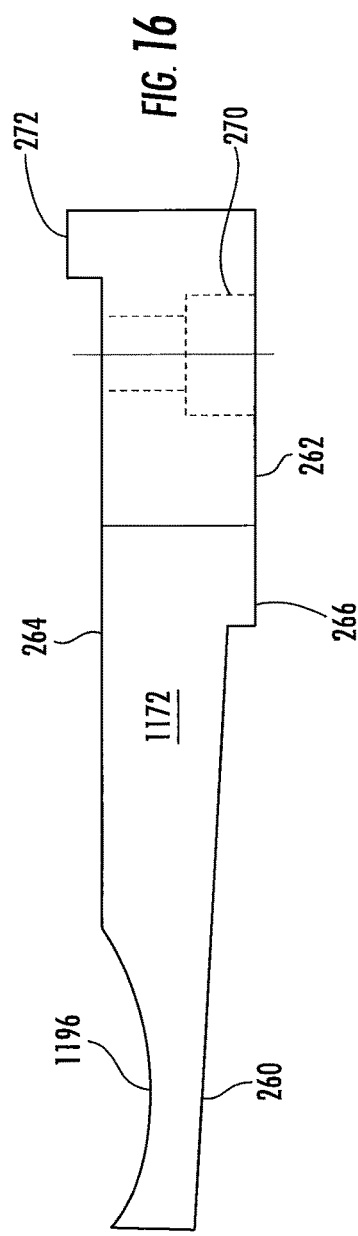

US 10,173,266 B2

METHOD AND APPARATUS FOR INSERTING AND REMOVING A DIFFERENTIAL CASE CUTTER

CROSS REFERENCE TO RELATED APPLICATIONS

The present application claims the benefit to U.S. Provisional patent Application No. 62/308,538 filed on Mar. 15, 2016, which is incorporated herein by reference in its entirety.

FIELD OF THE DISCLOSURE

The present disclosure relates to a method and apparatus for inserting and removing a differential case cutter from a differential case.

BACKGROUND OF THE DISCLOSURE

In order to machine an internal surface of a work piece, such as but not limited to a differential case, special purpose machines with a high initial cost. Additionally, these special purpose machines require service by specially trained personnel when they go down making them expensive to maintain. As a result, the conventional special purpose machines for machining the internal surface of a differential case increase the overall costs associated with manufacturing a differential case. It would therefore be advantageous to develop an apparatus and method for machining an internal surface of a work piece that reduces the overall costs associated with manufacturing the work piece.

SUMMARY OF THE DISCLOSURE

A method and apparatus for machining an internal surface of a differential case. A lathe having a turret and a pair of spindles are in electrical communication with a programmable computer. Integrally connected to the turret is a cutter gripper assembly having a pair of scissoring cutter grippers that are selectively grippingly engageable with a cutter.

Mounted horizontally on a tabletop of the lathe in a mount assembly is a differential case. Once the cutter gripping assembly engages the cutter, the programmable computer instructs the turret moves toward the differential case until the cutter is in a start position within the hollow portion of the case aligned with openings in a first and second tubular portion of the case and the pair of spindles.

The programmable computer then instructs the pair of spindles to extend through the openings in a first and second tubular portion of the differential case until the spindles are drivingly engaged with the cutter. After the pair of spindles are drivingly engaged with the cutter, the spindles spin the cutter and the pair of lathe spindles transition the cutter from a first cutting position to a second cutting position. When in the first cutting position, the cutter machines a first internal machining and when in the second cutting position, the cutter machines a second internal machining surface.

BRIEF DESCRIPTION OF DRAWINGS

The above, as well as other advantages of the present invention, will become readily apparent to those skilled in the art from the following detailed description when considered in the light of the accompanying drawings in which:

FIG. 4A is a schematic top-plan view of a first cutter gripper of the cutter gripping assembly illustrated in FIG. 4 according to an embodiment of the disclosure;

FIG. 4B is a schematic side-side view of the first cutter gripper illustrated in FIG. 4A;

FIG. 15 is a schematic side-view of a first cutter gripper according to an alternative embodiment of the disclosure;

FIG. 16 is a schematic side-view of a second cutter gripper according to an alternative embodiment of the disclosure;

DETAILED DESCRIPTION OF THE DISCLOSURE

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

It is within the scope of this disclosure, and as a non-limiting example, that the method and apparatus disclosed herein may be used in automotive, off-road vehicle, all-terrain vehicle, construction, structural, marine, aerospace, locomotive, military, machinery, robotic and/or consumer product applications.

Figure 1:
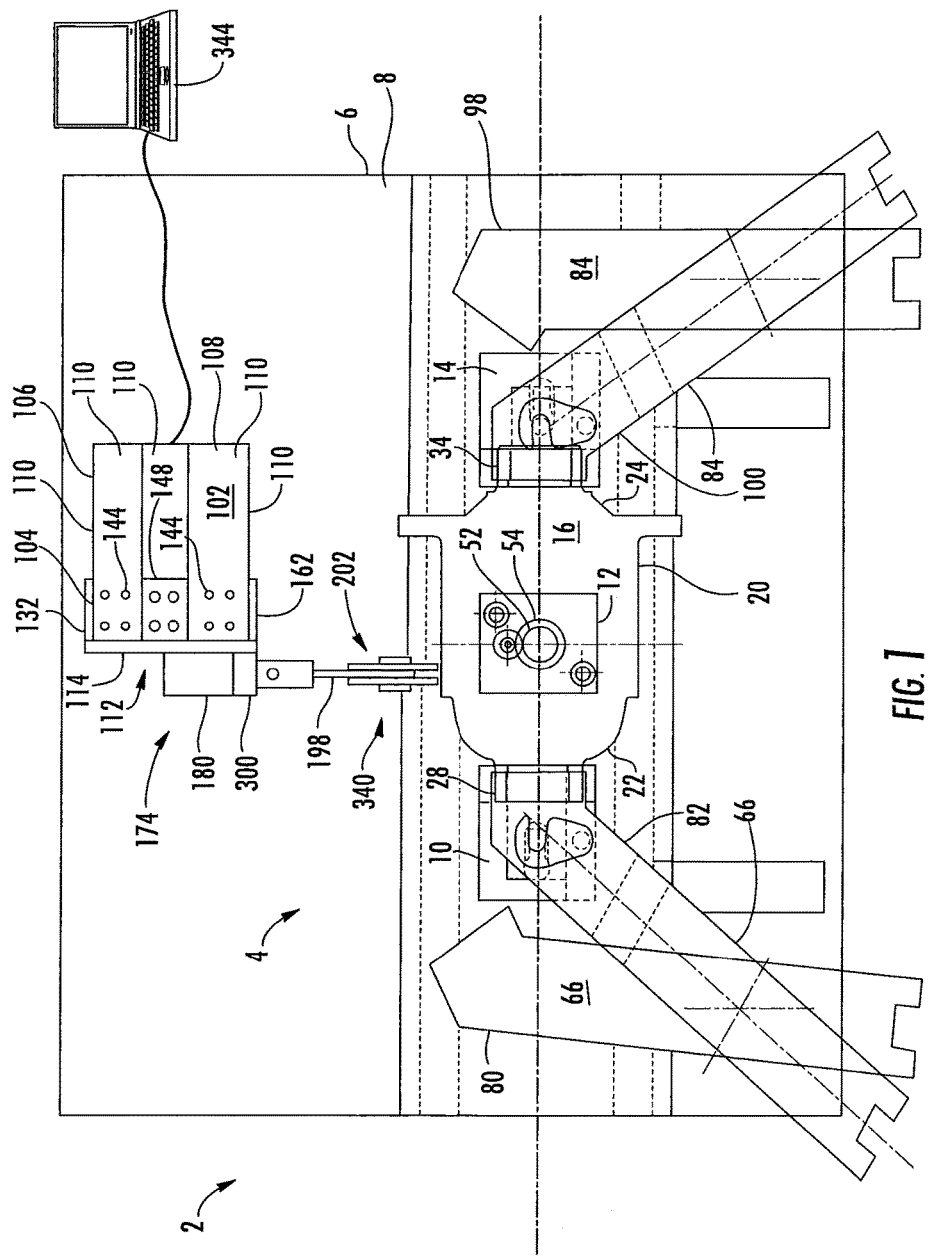
FIG. 1 is a schematic top-plan view of an apparatus according to an embodiment of the disclosure where a cutter gripping assembly is in a first position.
Figure 1A:
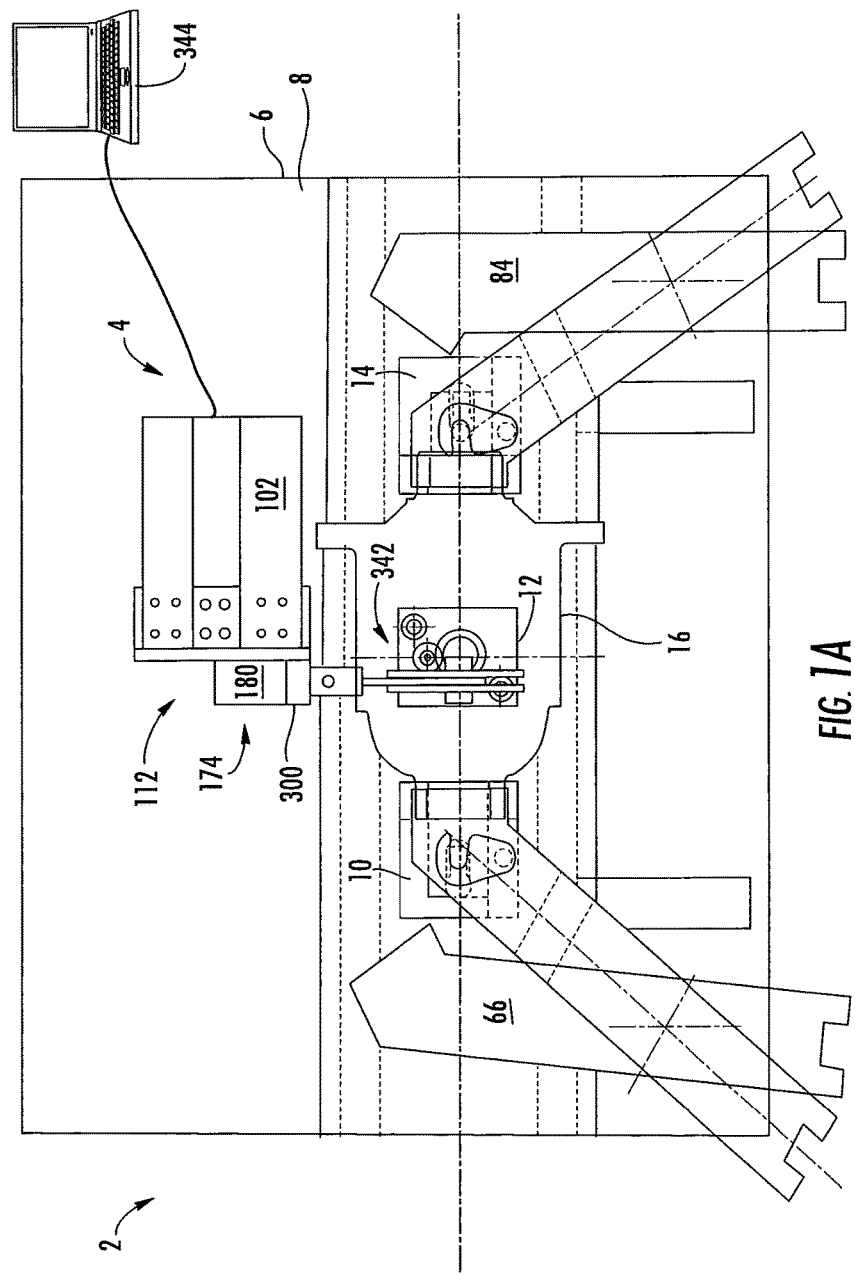
FIG. 1A is a schematic top-plan view of the apparatus illustrated in FIG. 1 where the cutter gripping assembly is in a second position.

FIGS. 1-9 are a schematic view of an apparatus 2 according to an embodiment of the disclosure. As illustrated in FIGS. 1 and 1A of the disclosure, the apparatus 2 includes a lathe assembly 4 having a tabletop 6 with an outer surface 8. Integrally connected to at least a portion of the outer surface 8 of the tabletop 6 is a first mounting block 10, a second mounting block 12 and/or a third mounting block 14. As a non-limiting example, the first mounting block 10, the second mounting block 12 and/or the third mounting block 14 are integrally connected to at least a portion of the outer surface 8 of the tabletop 6 of the lathe assembly 4 by using one or more mechanical fasteners and/or a dovetail connection. The first mounting block 10, the second mounting block 12 and/or a third mounting block 14 aid in securely attaching a work piece 16 to the tabletop 6 of the lathe assembly 4.

Figure 2:
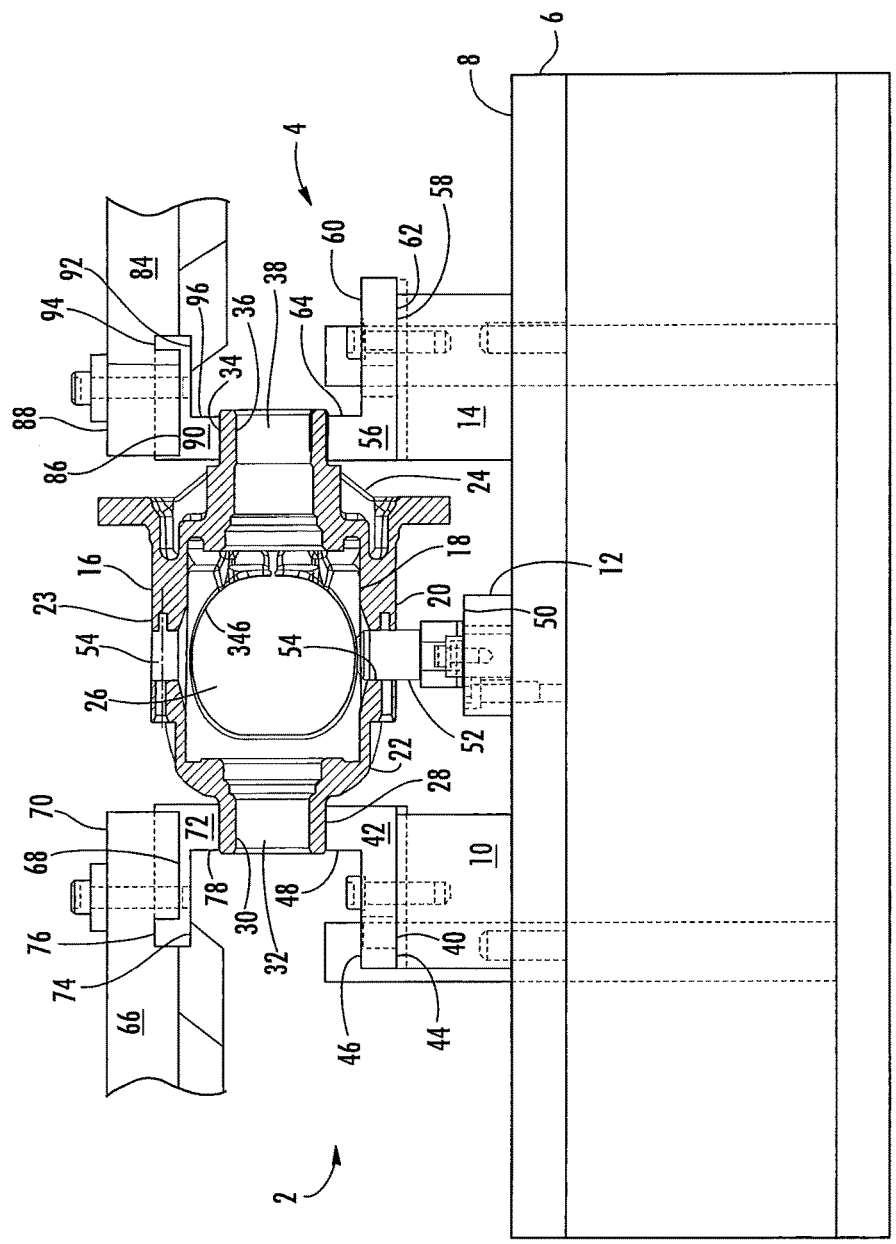
FIG. 2 is a schematic front-view of the apparatus illustrated in FIGS. 1 and 1A according to an embodiment of the disclosure.

As illustrated in FIGS. 1 and 2 of the disclosure and as a non-limiting example, the work piece 16 has an inner surface 18, an outer surface 20, a first end portion 22, an intermediate portion 23 and a second end portion 24. The inner surface 18 and the outer surface 20 of the work piece 16 defines a hollow portion 26 therein. In accordance with the embodiment of the disclosure illustrated in FIGS. 1 and 2 of the disclosure, the work piece 16 is a differential case, such as but not limited to, a single piece differential case.

Extending axially outboard form at least a portion of the first end portion 22 of the work piece 16 is a first tubular portion 28. The first tubular portion 28 has a substantially cylindrical internal surface 30 defining a first output shaft opening 32. As illustrated in FIG. 2 of the disclosure, first output shaft opening 32 of the work piece 16 extends axially inboard and connects to the hollow portion 26 of the work piece 16.

As illustrated in FIGS. 1 and 2 of the disclosure, extending axially outboard from at least a portion of the second end portion 24 of the work piece 16 is a second tubular portion 34. The second tubular portion 34 has a substantially cylindrical internal surface 36 defining a second output shaft opening 38. As illustrated in FIG. 2 of the disclosure, the second output shaft opening 38 extends axially inboard and connects to the hollow portion 26 of the work piece 16.

A first work piece cradle 42 having an inner surface 44 and an outer surface 46 is at least partially disposed between the outer surface 20 of the first tubular portion 28 of the work piece 16 and an outer surface 40 of the first mounting block 10. At least a portion of the inner surface 44 of the first work piece cradle 42 is integrally connected to the outer surface 40 of the first mounting block 10. As a non-limiting example, at least a portion of the inner surface 44 of the first work piece cradle 42 is integrally connected to at least a portion of the outer surface 40 of the first mounting block 10 by using one or more mechanical fasteners and/or a dovetail connection.

Extending radially outboard from at least a portion of the outer surface 46 of the first work piece cradle 42 is an attachment portion 48. At least a portion of the outer surface 46 of the attachment portion 48 of the first work piece cradle 42 has a shape that is complementary to the outer surface 20 of the first tubular portion 28 of the work piece 16.

As illustrated in FIGS. 1 and 2 of the disclosure, the second mounting block 12 is disposed between the first and third mounting blocks 10 and 14 of the apparatus 2. Integrally connected to at least a portion of an outer surface 50 of the second mounting block 12 is a locator-pin 52. As a non-limiting example, at least a portion of the locator-pin 52 is integrally connected to at least a portion of the outer surface 50 of the second mounting block 12 by using one or more mechanical fasteners and/or a dovetail connection. In accordance with the embodiment of the disclosure illustrated in FIGS. 1 and 2, at least a portion of the locator-pin 52 is received within one or more cross-pin openings 54 in the intermediate portion 23 of the work piece 16. The one or more cross-pin openings 54 extend from the inner surface 18 to the outer surface 20 of the work piece 16 and connect to the hollow portion 26 of the work piece 16. The locator-pin 52 is used to ensure that the work piece 16 does not rotate when the apparatus 2 is in operation.

A second work piece cradle 56 having an inner surface 58 and an outer surface 60 is at least partially disposed between the outer surface 20 of the second tubular portion 34 and an outer surface 62 of the third mounting block 14. At least a portion of the inner surface 58 of the second work piece cradle 56 is integrally connected to at least a portion of the outer surface 62 of the third mounting block 14. As a non-limiting example, at least a portion of the inner surface 58 of the second work piece cradle 56 is integrally connected to at least a portion of the outer surface 62 of the third mounting block 14 by using one or more mechanical fasteners and/or a dovetail connection.

Extending radially outboard from at least a portion of the outer surface 60 of the second work piece cradle 56 is an attachment portion 64. At least a portion of the outer surface 60 of the attachment portion 64 of the second work piece cradle 56 has a shape that is complementary to the outer surface 20 of the second tubular portion 34 of the work piece 16.

Disposed at least partially radially outboard from the first mounting block 10 and the first part cradle 42 is a first clamping arm 66 having an inner surface 68 and an outer surface 70. Integrally connected to at least apportion of the of the inner surface 68 of the first clamping arm 66 is a first clamping member 72 having an inner surface 74 and an outer surface 76. As a non-limiting example, at least a portion of the outer surface 76 of the first clamping member 72 is integrally connected to at least a portion of the inner surface 68 of the first clamping arm 66 by using one or more mechanical fasteners and/or a dovetail connection.

Extending from at least a portion of the inner surface 74 of the first clamping member 72 is an attachment portion 78. At least a portion of the inner surface 74 of the attachment portion 78 of the first clamping member 72 has a shape that is complementary to the outer surface 20 of the first tubular portion 28 of the first end portion 22 of the work piece 16.

According to an embodiment of the disclosure and as a non-limiting example, the first clamping arm 66 is fully articulable. As illustrated in FIGS. 1 and 1A of the disclosure, the first clamping arm 66 is movable from a first position 80 to a second position 82. In accordance with this embodiment of the disclosure, when the first clamping arm 66 is in the first position 80, the first clamping member 72 of the first clamping arm 66 is not in direct contact with the outer surface 20 of the first tubular portion 28 of the work piece 16. Additionally, when the first clamping member 66 is in the second position 82, at least a portion of the first clamping member 72 of the first clamping arm 66 is in direct contact with at least a portion of the outer surface 20 of the first tubular portion 28 of the work piece 16.

Disposed at least partially radially outboard from the third mounting block 14 and the second work piece cradle 56 is a second clamping arm 84 having an inner surface 86 and an outer surface 88. Integrally connected to at least apportion of the of the inner surface 86 of the second clamping arm 84 is a second clamping member 90 having an inner surface 92 and an outer surface 94. As a non-limiting example, at least a portion of the outer surface 94 of the second clamping member 90 is integrally connected to at least a portion of the inner surface 86 of the second clamping arm 84 by using one or more mechanical fasteners and/or a dovetail connection.

Extending from at least a portion of the inner surface 92 of the second clamping member 90 is an attachment portion 96. At least a portion of the inner surface 92 of the attachment portion 96 of the second clamping member 90 has a shape that is complementary to the outer surface 20 of the second tubular portion 34 of the second end portion 24 of the work piece 16.

According to an embodiment of the disclosure and as a non-limiting example, the second clamping arm 84 is fully articulable. As illustrated in FIGS. 1 and 1A of the disclosure, the second clamping arm 84 is movable from a first position 98 to a second position 100. In accordance with this embodiment of the disclosure, when the second clamping arm 84 is in the first position 98, the second clamping member 90 of the second clamping arm 84 is not in direct contact with the outer surface 20 of the second tubular portion 34 of the work piece 16. Additionally, when the second clamping member 84 is in the second position 100, at least a portion of the second clamping member 90 of the second clamping arm 84 is in direct contact with at least a portion of the outer surface 20 of the second tubular portion 34 of the work piece 16. As illustrated in FIGS. 1 and 2 of the disclosure, the first mounting block 10, the first work piece cradle 42, the third mounting block 14, the second work piece cradle 56, the first clamping arm 66, the first clamping member 72, the second clamping arm 84 and the second clamping member 90 of the apparatus 2 prevent the work piece 16 from moving axially when the apparatus 2 is in operation.

The apparatus 2 further includes a turret 102 having a first end portion 104, a second end portion 106 and an outer surface 108. As illustrated in FIGS. 1 and 1A of the disclosure, the outer surface 108 of the turret 102 has one or more substantially flat mounting surfaces 110.

Figure 3:
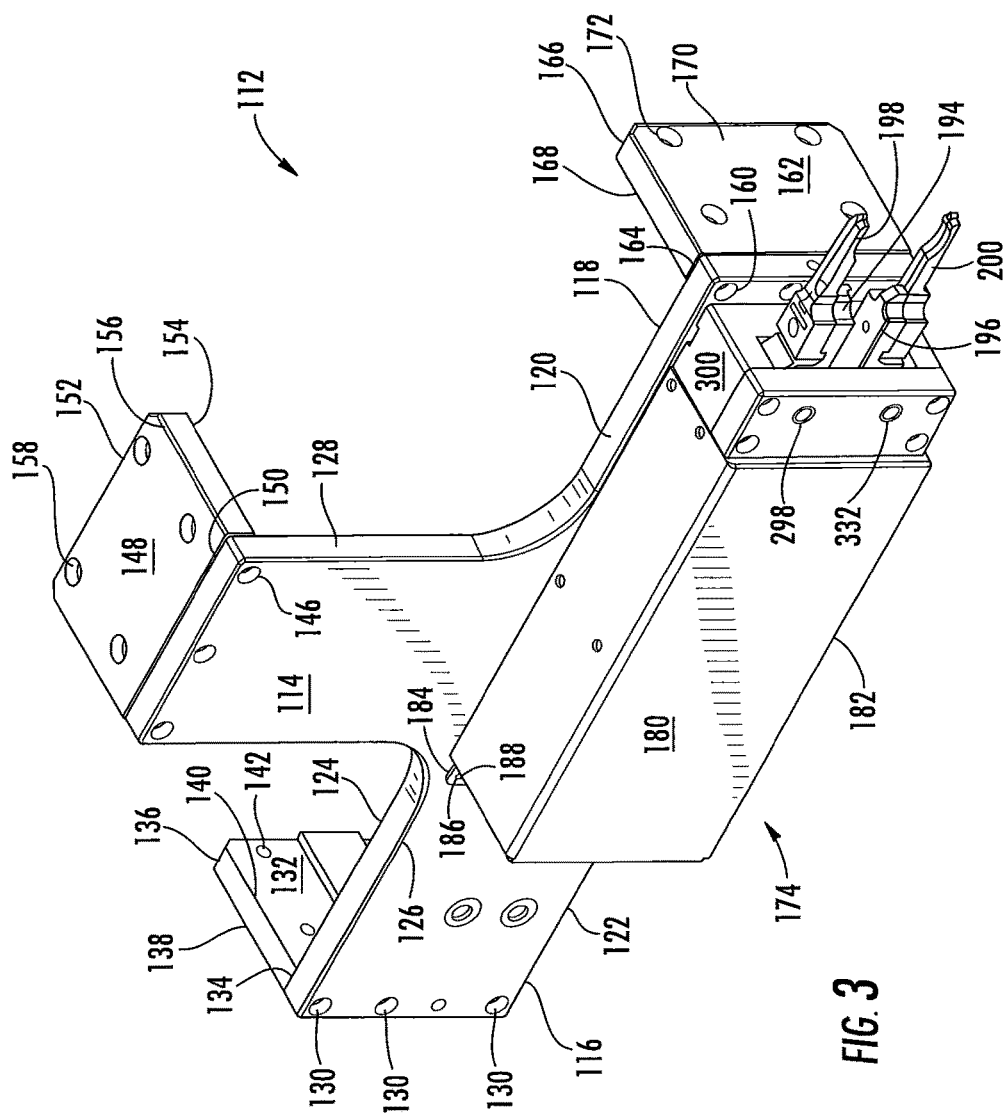
FIG. 3 is a schematic perspective-view of a cutter gripping assembly of the apparatus illustrated in FIG. 1 according to an embodiment of the disclosure.

Disposed at least partially axially outboard from the first end portion 104 of the turret 102 is a cutter gripping assembly 112. As illustrated in FIGS. 1 and 3 of the disclosure, the cutter gripping assembly 112 includes a turret-mounting member 114 having a first end portion 116, a second end portion 118, a top surface 120, a bottom surface 122, an inboard surface 124 and an outboard surface 126. Extending from at least a portion of the top surface 120 of the turret-mounting member 114 is a protruding portion 128. In accordance with the embodiment illustrated in FIGS. 1 and 3 of the disclosure and as a non-limiting example, the turret-mounting member 114 is a T-shaped member.

Extending from the inboard surface 126 to the outboard surface 128 of the first end portion 116 of the turret-mounting member 114 is one or more attachment apertures 130.

A first turret attachment member 132 having a first end 134, a second end 136, an outboard surface 138 and an inboard surface 140 is integrally connected to at least a portion of the inboard surface 124 of the first end portion 116 of the turret-mounting member 114. Extending into the first turret attachment member 132 from the first end 134 is one or more complementary mechanical fastener receiving portions (not shown). In order to connect the first end 134 of the first turret attachment member 132 to the inboard surface 124 of the turret-mounting member 114, one or more mechanical fasteners (not shown) extend through the one or more attachment apertures 130 and into the one or more complementary mechanical fastener receiving portions (not shown). The one or more mechanical fasteners (not shown) are retained within the one or more mechanical fasteners (not shown) by using a threaded connection or a press-fit connection. It is within the scope of this disclosure that the first end 134 of the first turret attachment member 132 may be integrally connected to the inboard surface 124 of the turret-mounting member 114 by using one or more mechanical fasteners, one or more welds and/or a dovetail connection.

Extending from the outboard surface 138 to the inboard surface 140 of the first turret attachment member 132 is one or more turret attachment apertures 142. In order to connect the first turret attachment member 132 to one of the one or more substantially flat mounting surfaces 110 of the turret 102, one or more mechanical fasteners (not shown) extend through the one or more turret attachment apertures 142 in the first turret attachment member 132. At least a portion of the one or more mechanical fasteners (not shown) are the received and retained within one or more mechanical fastener receiving portions 144 in the one or more substantially flat mounting surfaces 110 of the turret 102.

As illustrated in FIG. 3 of the disclosure, extending from the inboard surface 126 to the outboard surface 128 of the protruding portion 128 of the turret-mounting member 114 is one or more attachment apertures 146.

A second turret attachment member 148 having a first end 150, a second end 152, an inboard surface 154 and an outboard surface 156 is integrally connected to at least a portion of the inboard surface 124 of the protruding portion 128 of the turret-mounting member 114. Extending into the second turret attachment member 148 from the first end 150 is one or more complementary mechanical fastener receiving portions (not shown). In order to connect the first end 150 of the second turret attachment member 148 to the inboard surface 124 of the turret-mounting member 114, one or more mechanical fasteners (not shown) extend through the one or more attachment apertures 146 and into the one or more complementary mechanical fastener receiving portions (not shown). It is within the scope of this disclosure that the first end 150 of the second turret attachment member 148 may be integrally connected to the inboard surface 124 of the turret-mounting member 114 by using one or more mechanical fasteners, one or more welds and/or a dovetail connection.

Extending from the outboard surface 156 to the inboard surface 154 of the second turret attachment member 148 is one or more turret attachment apertures 158. In order to connect the second turret attachment member 148 to one of the one or more substantially flat mounting surfaces 110 of the turret 102, one or more mechanical fasteners (not shown) extend through the one or more turret attachment apertures 158 in the second turret attachment member 148. At least a portion of the one or more mechanical fasteners (not shown) are the received and retained within the one or more mechanical fastener receiving portions 144 in the one or more substantially flat mounting surfaces 110 of the turret 102.

As illustrated in FIG. 3 of the disclosure, extending from the inboard surface 126 to the outboard surface 128 of the second end portion 118 of the turret-mounting member 114 is one or more attachment apertures 160.

A third turret attachment member 162 having a first end 164, a second end 166, an inboard surface 168 and an outboard surface 170 is integrally connected to at least a portion of the inboard surface 124 of the first second portion 118 of the turret-mounting member 114. Extending into the third turret attachment member 162 from the first end 164 is one or more complementary mechanical fastener receiving portions (not shown). In order to connect the first end 164 of the third turret attachment member 162 to the inboard surface 124 of the turret-mounting member 114, one or more mechanical fasteners (not shown) extend through the one or more attachment apertures 160 and into the one or more complementary mechanical fastener receiving portions (not shown). It is within the scope of this disclosure that the first end 164 of the third turret attachment member 162 may be integrally connected to the inboard surface 124 of the turret-mounting member 114 by using one or more mechanical fasteners, one or more welds and/or a dovetail connection.

Extending from the outboard side 170 to the inboard side 168 of the third turret attachment member 162 is one or more turret attachment apertures 172. In order to connect the third turret attachment member 162 to one of the one or more substantially flat mounting surfaces 110 of the turret 102, one or more mechanical fasteners (not shown) extend through the one or more turret attachment apertures 172 in the third turret attachment member 162. At least a portion of the one or more mechanical fasteners (not shown) are the received and retained within the one or more mechanical fastener receiving portions 144 in the one or more substantially flat mounting surfaces 110 of the turret 102.

In accordance with an alternative embodiment of the disclosure (not shown), the first turret attachment member 132, the second turret attachment member 148 and/or the third turret attachment member 162 are integrally formed as part of the turret-mounting member 114. As a result, the turret-mounting member 114 is a single unitary structure.

Integrally connected to at least a portion of the outboard surface 126 of the turret-mounting member 114 is a gripping apparatus 174 of the cutter gripping assembly 112. As illustrated in FIGS. 1, 3-7 of the disclosure, a hydraulic cylinder 176 is disposed within a hollow interior portion 178 of a housing 180. At least a portion of an outer surface 182 of the housing 180 is integrally connected to at least a portion of the outboard surface 126 of the turret-mounting member 114 of the cutter gripping assembly 112. According to the embodiment of the disclosure illustrated in FIG. 3, the housing 180 of the gripping apparatus 174 includes one or more flange portions 184 having one or more attachment apertures 186. In order to attach the gripping apparatus 174 to the outboard surface 126 of the turret-mounting member 114, one or more mechanical fasteners 188 are inserted through the one or more attachment apertures 186 and retained within one or more complementary mechanical fastener receiving portions (not shown) in the outboard surface 126 of the turret-mounting member 114. It is within the scope of this disclosure that the gripping apparatus 174 may be connected to the outboard surface 126 of the turret-mounting member 114 by using one or more mechanical fasteners and/or one or more welds.

Figure 4:
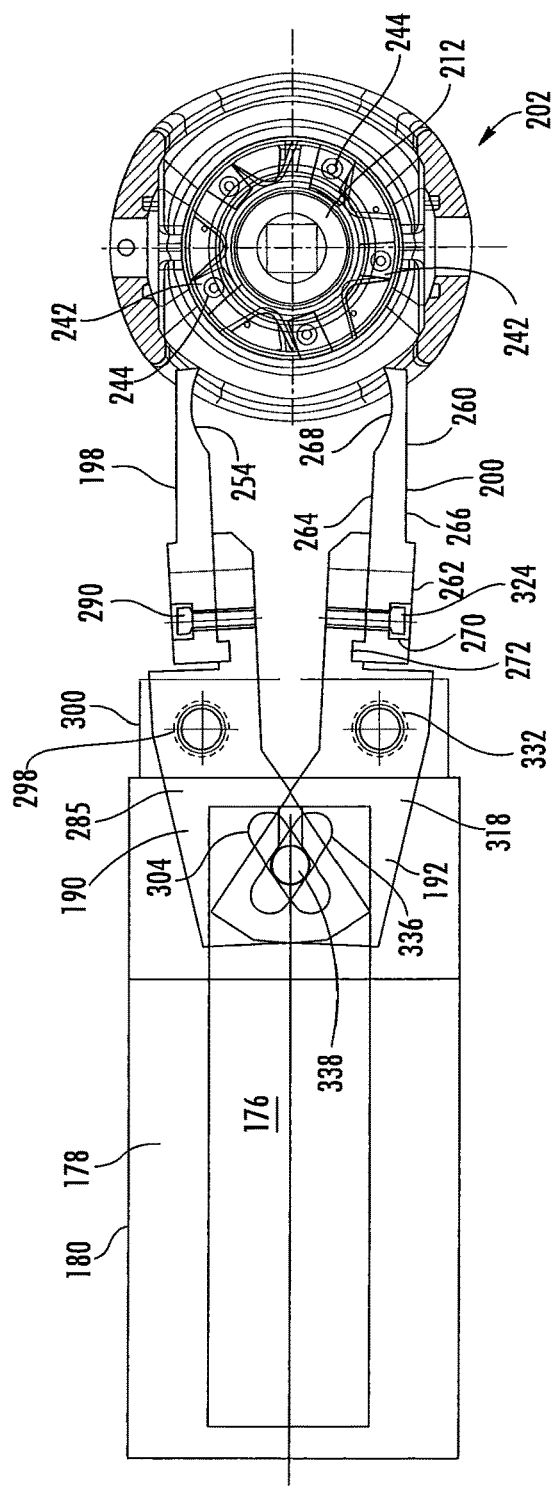
FIG. 4 is a schematic side-view of a portion of the cutter gripping assembly illustrated in FIGS. 1 and 3 when the cutter gripping assembly is in a grippingly disengaged position.
Figure 5:
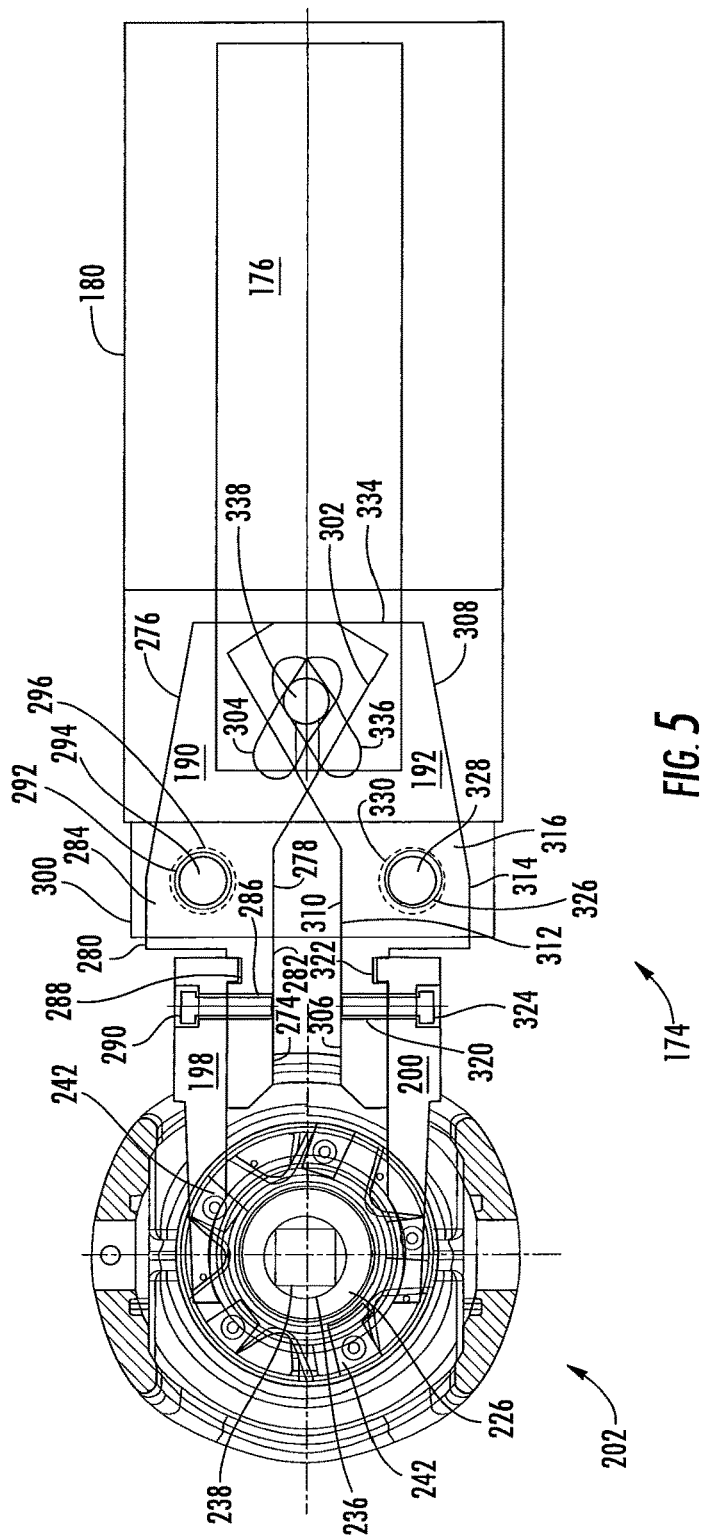
FIG. 5 is a schematic side-view of a portion of the cutter gripping assembly illustrated in FIG. 4 when the cutter gripping assembly is in a grippingly engaged position.
Figure 6:
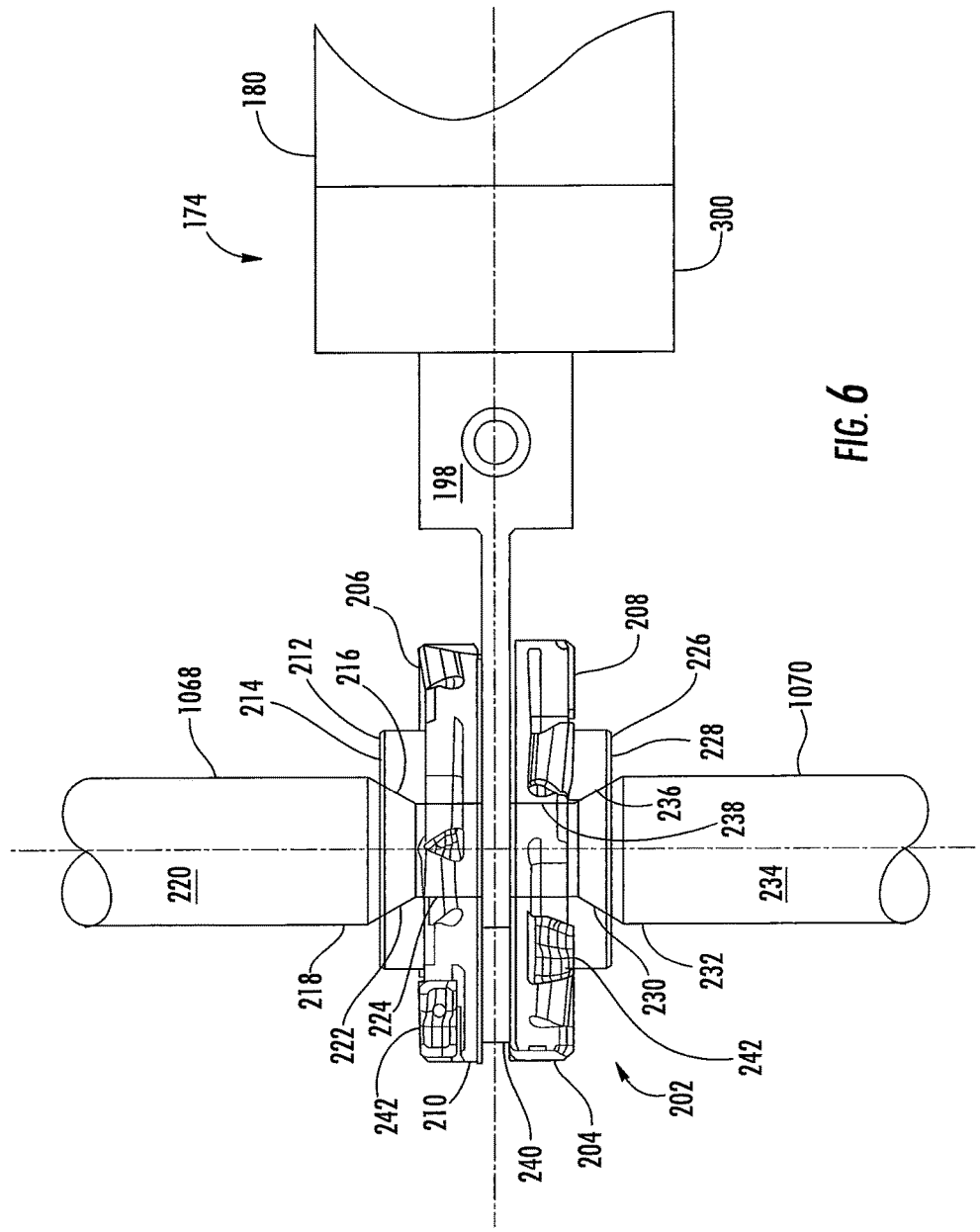
FIG. 6 is a schematic top-plan view of the cutter gripping assembly in the grippingly engaged position illustrated in FIG. 5 of the disclosure.
Figure 7:
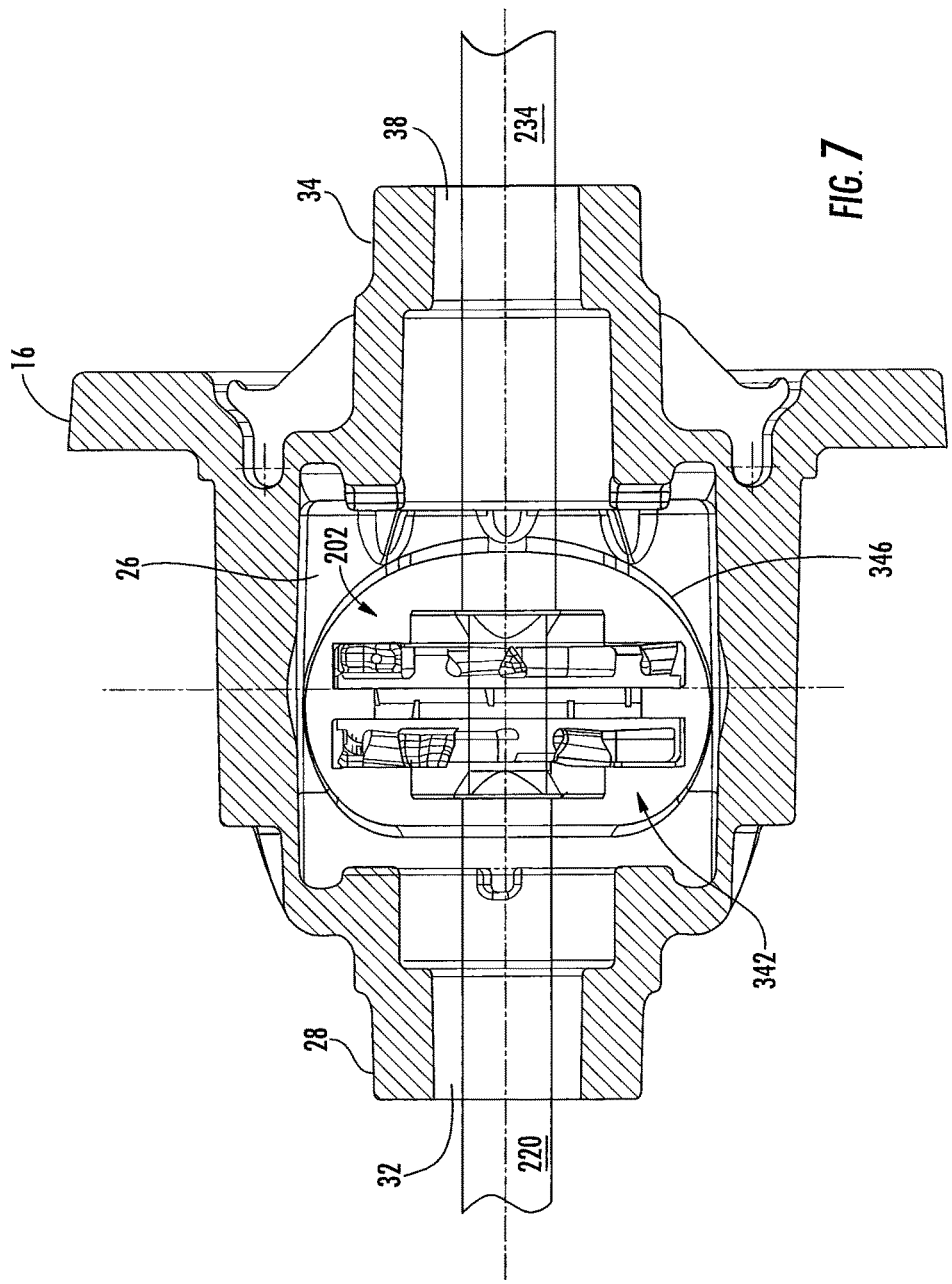
FIG. 7 is a cut-away schematic side-view of a cutter disposed within a hollow portion of a work piece where the cutter is in a first position or home position.
Figure 8:
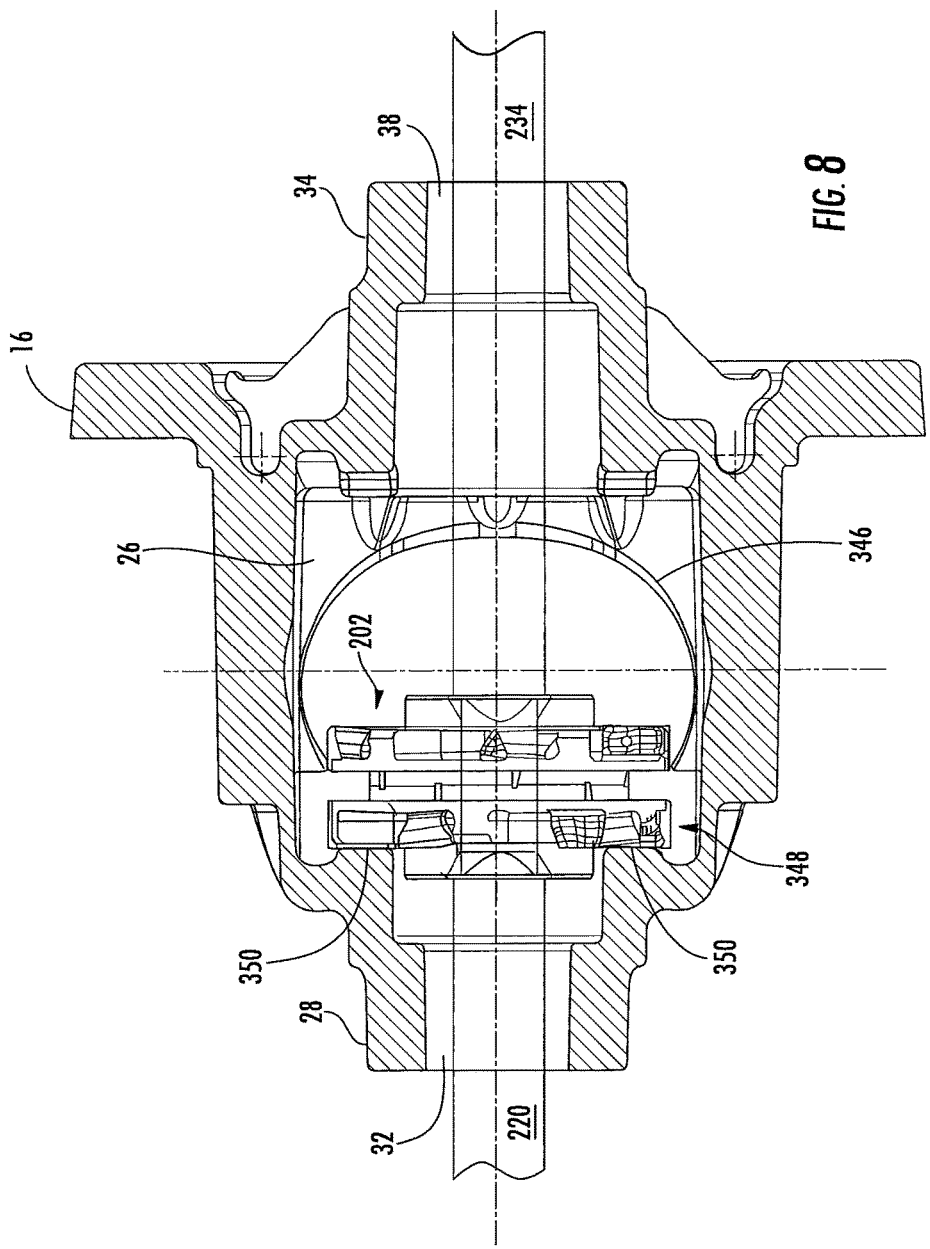
FIG. 8 is a cut-away schematic side-view of the cutter within the work piece illustrated in FIG. 7 where the cutter is in a second position.
Figure 9:
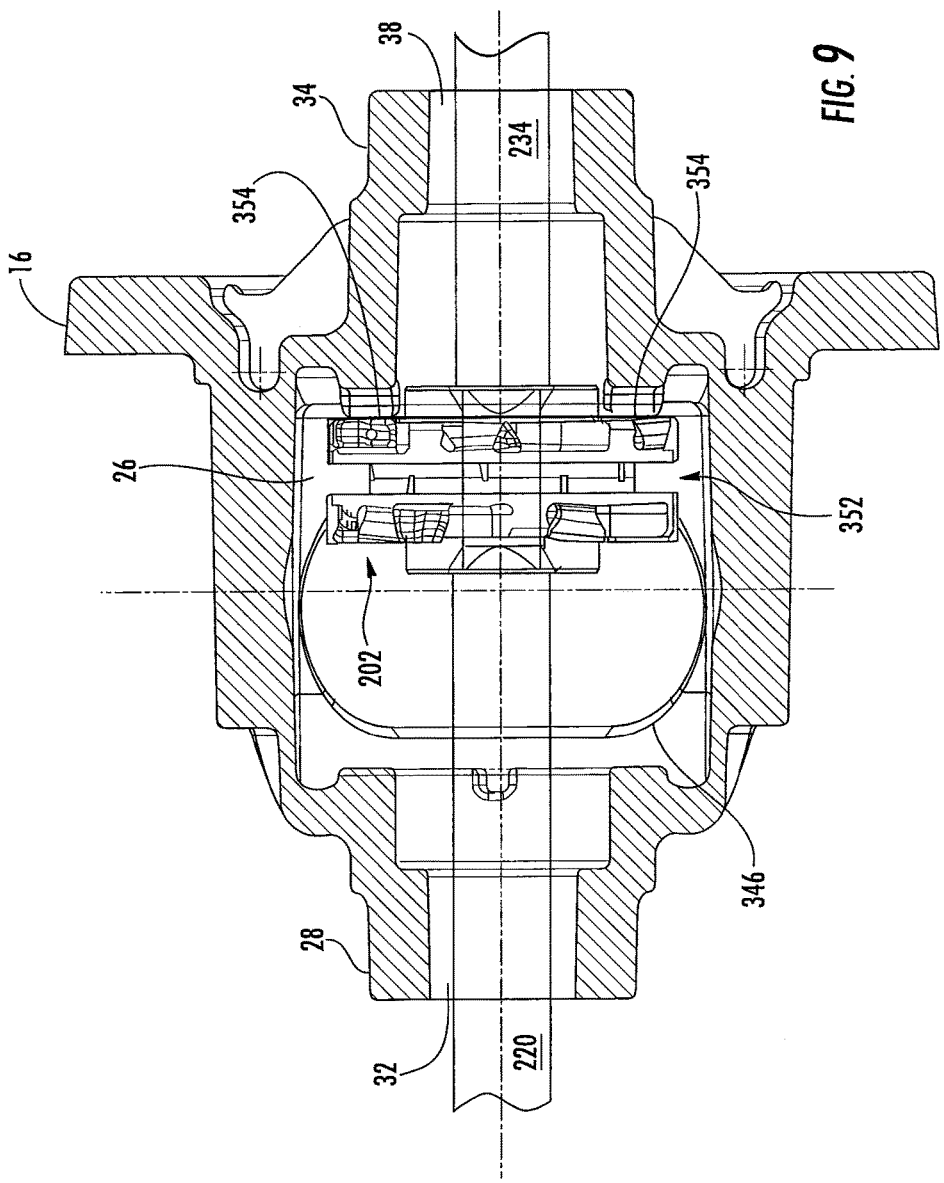
FIG. 9 is a cut-away schematic side-view of the cutter within the work piece illustrated in FIGS. 7 and 8 where the cutter is in a third position.

The gripping apparatus 174 further includes a first scissor arm 190, a second scissor arm 192, a first cutter gripper 198 and a second cutter gripper 200. As illustrated in FIGS. 4, 5 and 6 of the disclosure, the first and second cutter grippers 198 and 200 are used to grab a cutter 202 having a substantially cylindrical intermediate portion 204 having a first side 206, a second side 208 and an outer surface 210. The cutter 202 is used to machine the inner surface 18 of the work piece 16.

Extending from at least a portion of the first side 206 of the substantially cylindrical intermediate portion 204 of the cutter 202 is a first spindle attachment portion 212 having an outboard surface 214. As illustrated in FIGS. 4, 5 and 6 of the disclosure, a first spindle-receiving portion 216 extends from the outboard surface 214 of the first spindle attachment portion 212 and into the substantially cylindrical intermediate portion 204 of the cutter 202. The first spindle-receiving portion 216 has a shape that is complementary to a first end portion 218 of a first spindle 220. In accordance with an embodiment of the disclosure and as a non-limiting example, the first end portion 218 of the first spindle 220 includes a truncated cone portion 222 and a square-shaped portion 224. As illustrated in FIG. 6 of the disclosure, the square-shaped portion 224 of the first spindle 220 is adjacent to the truncated cone portion 222 of the first spindle 220 on the outermost end of the first end portion 218 of the first spindle 220.

A second spindle attachment portion 226 having an outboard surface 228 extends from at least a portion of the second side 208 of the substantially cylindrical intermediate portion 204 of the cutter 202. As illustrated in FIGS. 4, 5 and 6 of the disclosure, a second spindle-receiving portion 230 extends from the outboard surface 228 of the second spindle attachment portion 226 and into the substantially cylindrical portion 204 of the cutter 202. The second spindle-receiving portion 230 has a shape that is complementary to a first end portion 232 of a second spindle 234. In accordance with an embodiment of the disclosure and as a non-limiting example, the first end portion 232 of the second spindle 234 includes a truncated cone portion 236 and a square-shaped portion 238. As illustrated in FIG. 6 of the disclosure, the square-shaped portion 238 of the second spindle 234 is adjacent to the truncated cone portion 236 of the second spindle 234 on the outermost end of the first end portion 232 of the second spindle 234.

Circumferentially extending along at least a portion of the outer surface 210 of the substantially cylindrical intermediate portion 204 of the cutter 202 is a gripper groove 240. The gripper groove 240 is of a size and shape to receive at least a portion of the first and second cutter grippers 198 and 200.

As illustrated in FIGS. 4, 5 and 6 of the disclosure, one or more cutting elements 242 are integrally connected to at least a portion of the first side 206 and the second side 208 of the substantially cylindrical intermediate portion 294 of the cutter 202. According to the embodiment of the disclosure illustrated in FIGS. 4 and 5, the one or more cutting elements 242 are integrally connected to the first and second sides 206 and 208 of the substantially cylindrical intermediate portion 204 of the cutter 202 by using one or more mechanical fasteners 244. This allows the one or more cutting elements 242 to be individually replaced as they wear down. In accordance with an alternative embodiment of the disclosure (not shown), the one or more cutting elements may be integrally formed as part of the first and second side of the substantially cylindrical portion of the cutter. According to this embodiment of the disclosure (not shown), when the one or more cutting elements on the cutter wear down, the entire cutter would be replaced.

According to the embodiment of the disclosure illustrated in FIGS. 4, 4A, 4B and 5, the first cutter gripper 198 has a first end portion 246, a second end portion 248, a top surface 250 and a bottom surface 252. Extending along at least a portion of the bottom surface 252 of the first end portion 246 of the first cutter gripper 198 is a gripping portion 254. The gripper portion 252 of the first cutter gripper 198 has a shape that is complementary to the outer surface 210 of the gripper groove 240 in the substantially cylindrical intermediate portion 204 of the cutter 202.

Extending from the top surface 250 to the bottom surface 252 of the second end portion 248 of the first cutter gripper 198 is one or more mechanical fastener apertures 256.

As illustrated in FIGS. 4, 4A, 4B and 5 of the disclosure, a locator portion 258 extends from at least a portion of the second end portion 248 of the first cutter gripper 198. The locator portion 258 on the second end portion 248 of the first cutter gripper 198 aids in attaching the first cutter gripper 198 to the first gripper mount 194 of the gripping apparatus 174.

In accordance with the embodiment of the disclosure illustrated in FIGS. 4, 4A, 4B and 5, the second cutter gripper 200 is a mirror image of the first cutter gripper 198. The second cutter gripper 200 has a first end portion 260, a second end portion 262, a top surface 264 and a bottom surface 266. Extending along at least a portion of the top surface 264 of the first end portion 260 of the second cutter 200 is a gripper portion 268.

Extending from the top surface 264 to the bottom surface 266 of the second end portion 262 of the second cutter gripper 200 is one or more mechanical fastener apertures 270.

As illustrated in FIGS. 4, 4A, 4B and 5 of the disclosure, a locator portion 272 extends from at least a portion of the second end portion 262 of the second cutter gripper 200. The locator portion 272 on the second end portion 262 of the second cutter gripper 200 aids in attaching the second cutter gripper 200 to the second gripper mount 196 of the gripping apparatus 174.

Disposed at least partially axially outboard from the first cutter gripper 198 is the first scissor arm 190 of the gripping apparatus 174. The first scissor arm 190 has a first end portion 274, a second end portion 276, an intermediate portion 278, a top surface 280, a bottom surface 282, a first side 284 and a second side 285. Extending from the top surface 280 to the bottom surface 282 of the first scissor arm 190 is on or more mechanical fastener apertures 286 that are complementary to the one or more mechanical fastener apertures 256 in the first cutter gripper 198.

A locator channel 288 extends along at least a portion of the top surface 280 of the first scissor arm 190. The locator channel 288 is of a size and a shape that is complementary to the locator portion 272 on the first cutter gripper 198. When the first cutter gripper 198 is attached to the first scissor arm 190, at least a portion of the locator portion 258 on the first cutter gripper 198 is disposed within the locator channel 288 in the first scissor arm 190.

In order to secure the first cutter gripper 198 to the first scissor arm 190, one or more mechanical fasteners 190 are inserted though the one or more mechanical attachment apertures 256 in the first cutter gripper 198 and are retained within the one or more mechanical attachment apertures 286 in the first scissor arm 190. The one or more mechanical fasteners 290 are retained within the one or more mechanical attachment apertures 286 in the first scissor arm 190 by a threaded connection.

Extending from the first side 284 to the second side 285 of the intermediate portion 278 of the first scissor arm 190 is a dowel pin aperture 292. The dowel pin aperture 292 is of a size and shape to receive at least a portion of a first dowel pin 294. The first dowel pin 294 provides a pilotable connection for the first scissor arm 190. According to the embodiment of the disclosure illustrated in FIGS. 3, 4 and 5, the opposing ends of the first dowel pin 294 are supported within dowel pin mount apertures 296 and 298 in a dowel pin mount 300.

As illustrated in FIGS. 4 and 5 of the disclosure, the second end portion 276 of the first scissor arm 190 has a radially inward extending portion 302. Extending from the first side 284 to the second side 285 of the radially inward extending portion 302 of the first scissor arm 190 is an angled scissor pin aperture 304. As a non-limiting example, the angled scissor pin aperture 304 in the second end portion 276 of the first scissor arm 190 is substantially pill-shaped.

Disposed at least partially axially outboard from the second cutter gripper 200 is the second scissor arm 192 of the gripping apparatus 174. The second scissor arm 192 has a first end portion 306, a second end portion 308, an intermediate portion 310, a top surface 312, a bottom surface 314, a first side 316 and a second side 318. Extending from the top surface 312 to the bottom surface 314 of the second scissor arm 192 is on or more mechanical fastener apertures 320 that are complementary to the one or more mechanical fastener apertures 270 in the second cutter gripper 200.

A locator channel 322 extends along at least a portion of the top surface 312 of the second scissor arm 192. The locator channel 322 is of a size and a shape that is complementary to the locator portion 372 on the second cutter gripper 200. When the second cutter gripper 200 is attached to the second scissor arm 192, at least a portion of the locator portion 272 on the second cutter gripper 200 is disposed within the locator channel 322 in the second scissor arm 192.

In order to secure the second cutter gripper 200 to the second scissor arm 192, one or more mechanical fasteners 324 are inserted though the one or more mechanical attachment apertures 270 in the second cutter gripper 200 and are retained within the one or more mechanical attachment apertures 320 in the second scissor arm 192. The one or more mechanical fasteners 324 are retained within the one or more mechanical attachment apertures 320 in the second scissor arm 192 by a threaded connection.

Extending from the first side 316 to the second side 318 of the intermediate portion 310 of the second scissor arm 192 is a dowel pin aperture 326. The dowel pin aperture 326 is of a size and shape to receive at least a portion of a second dowel pin 328. The second dowel pin 328 provides a pilotable connection for the second scissor arm 192. According to the embodiment of the disclosure illustrated in FIGS. 3, 4 and 5, the opposing ends of the second dowel pin 328 are supported within dowel pin mount apertures 330 and 332 in the dowel pin mount 300.

As illustrated in FIGS. 4 and 5 of the disclosure, the second end portion 308 of the second scissor arm 192 has a radially inward extending portion 334. Extending from the first side 316 to the second side 318 of the radially inward extending portion 334 of the second scissor arm 192 is an angled scissor pin aperture 336. As a non-limiting example, the angled scissor pin aperture 336 in the second end portion 308 of the second scissor arm 192 is substantially pill-shaped.

In order to open and close the cutter gripping assembly 112, the hydraulic cylinder 176 linearly actuates a scissor pin 338. As illustrated in FIGS. 4 and 5 of the disclosure, at least a portion of the scissor pin 338 is disposed within the angled scissor pin apertures 304 and 336 of the first and second scissor arms 190 and 192. When the hydraulic cylinder 176 extends to the position illustrated in FIG. 4, the distance between the first and second cutter grippers 198 and 200 increases. In this position, the first and the second cutter grippers 198 and 200 are not grippingly engaged with the cutter 202.

As illustrated in FIG. 5 of the disclosure, when the hydraulic cylinder 176 retracts, the distance between the first and second cutter grippers 198 and 200 decreases. In this position, the first and the second cutter grippers 198 and 200 are grippingly engaged with the cutter 202.

A programmable computer 344 controls the turret 102 and the cutter gripping assembly 112 of the apparatus 2. When the cutter gripping assembly 112 is grippingly engaged with the cutter 202, the cutter gripping assembly 112 is in a home position 340. In order to begin machining the inner surface 18 of the work piece 16, the cutter gripping assembly 112 needs to transition from the home position 340 illustrated in FIG. 1 to the start position 342 illustrated in FIG. 1A. In response to a signal received from the programmable computer 344, the turret 102 is driven linearly from the home position 340 to a start position 342 inserting the cutter 202 through a differential case window 346 and within the hollow portion 26 of the work piece 16. As illustrated in FIGS. 1, 1A and 6-9 of the disclosure, when the cutter 202 is in the start position 342 within the hollow portion 26 of the work piece 16, the cutter 202 is co-axial with the first and second spindles 220 and 234.

Once the cutter 202 is in the start position 342, the programmable computer 344 instructs the first and second spindles 220 and 234 to be driven axially inboard through the first and second tubular portions 28 and 34 of the work piece 16 and into the hollow portion 26 of the work piece 16. The first and second spindles 220 and 234 are driven axially inboard until they are received within the spindle attachment portions 212 and 226 of the cutter 202 thereby drivingly connecting the cutter 202 to the spindles 220 and 234.

Once the cutter 202 is drivingly connected to the first and second spindles 220 and 234, the programmable computer 344 instructs the hydraulic cylinder 176 to extend the scissor pin 338 disengaging the first and second cutter grippers 198 and 200 from the cutter 202. When the cutter gripping assembly 112 is grippingly disengaged from the cutter 202, the programmable computer 344 then instructs the turret 102 to move linearly from the start position 342 to the home position 340 where no piece of the cutter gripping assembly 112 is located within the hollow portion 26 of the work piece 16.

After turret 102 has returned to the home position 340, the programmable computer 344 instructs the first and second spindle 220 and 234 to rotate at the same speed thereby rotating the cutter 202. The programmable computer 344 then instructs the first spindle 220 to axially retract while the second spindle 234 axially extends at the same rate. This transitions the cutter 202 from the start position 324 to a first cutting position 348 where the cutter 202 machines a first internal machining surface 350 of the work piece 16. As a non-limiting example, the first internal machining surface 350 is a first differential side gear surface.

When the a pre-determined amount of material has been removed from the first internal machining surface 350, the programmable computer 344 instructs the first spindle 220 to axially extend at the same rate as the second spindle 234 axially retracts. This transitions the cutter 202 from the first cutting position 348 to a second cutting position 352 where the cutter 202 machines a second internal machining surface 354 of the work piece 16. As a non-limiting example, the second internal machining surface 352 is a second differential side gear surface.

Once a pre-determined amount of material has been removed from the second internal machining surface 354, the programmable computer 344 instructs the first spindle 220 to axially retract at the same rate as the second spindle 234 axially extends until the cutter 202 is back in the start position 342. When the cutter 202 is in the start position 342, the programmable computer 344 instructs the turret 102 to linearly move the cutter gripping assembly 112 from the home position 340 to the start position 342 and to engage the cutter 202.

With the cutter gripping assembly 112 grippingly engaged with the cutter 202, the first and second spindles 220 and 234 axially retract until the spindles 220 and 234 are no longer within the work piece 16. The work piece 16 is then be removed from the lathe assembly 4 and a new work piece (not shown) can be inserted to begin the process over again.

FIGS. 10-20 are a schematic view of an apparatus 2 according to an alternative embodiment of the disclosure. The apparatus 2 illustrated in FIGS. 1-9 is the same as the apparatus 2 illustrated in FIGS. 10-20 except where specifically noted below. As illustrated in FIGS. 10-13 of the disclosure, the apparatus 2 includes a mounting assembly 1000 that is integrally connected to the outer surface 8 of the tabletop 6. The mounting assembly 1000 has a base portion 1002 having an inner surface 1004 and an outer surface 1006. At least a portion of the inner surface 1004 of the base portion 1002 is integrally connected to at least a portion of the outer surface 8 of the tabletop 6 of the apparatus 2. As a non-limiting example, at least a portion of the inner surface 1004 of the base portion 1002 is integrally connected to at least a portion of the outer surface 8 of the tabletop 6 by using one or more mechanical fasteners and/or a dovetail connection.

Integrally connected to at least a portion of the outer surface 1006 of the base portion 1002 of the mounting assembly 1000 is a mounting portion 1008 having an inner surface 1010, an outer surface 1012, a first end portion 1014, a second end portion 1016 and an intermediate portion 1018. As a non-limiting example, at least a portion of the inner surface 1010 of the mounting portion 1008 is integrally connected to at least a portion of the outer surface 1006 of the base portion 1002 of the mounting assembly 1000 by using one or more welds, one or more mechanical fasteners and/or a dovetail connection.

Extending from the outer surface 1012 to the inner surface 1010 of the first end portion 1014 of the mounting portion 1008 is an opening 1020.

A work piece centering assembly 1022 having an inner surface 1024, an outer surface 1026, interior surface 1028 and an exterior surface 1030 is integrally connected at the outer surface 1012 of the mounting portion 1008 of the mounting assembly 1000. As illustrated in FIGS. 10-13 of the disclosure, at least a portion of the inner surface 1024 of the work piece centering assembly 1022 is integrally connected to at least apportion of the outer surface 1018 of the mounting portion 1008 by using one or more welds, one or more mechanical fasteners and/or a dovetail connection. In accordance with an alternative embodiment of the disclosure (not shown), the work piece centering assembly may be integrally formed as part of the mounting portion of the mounting assembly as a single unitary piece.

Extending from the inner surface 1024 to the outer surface 1026 of the work piece centering assembly 1022 is an opening 1031 that is defined by the interior surface 1028 of the work piece centering assembly 1022. The opening 1031 in the work piece centering assembly 1022 is radially aligned with the opening 1020 in the mounting portion 1008 of the mounting assembly 1000. As a non-limiting example, the work piece centering assembly 1022 is substantially C-shaped.

Circumferentially extending along at least a portion of the exterior surface 1030 of the work piece centering assembly 1022 is a cam groove 1032. The cam groove 1032 is of a size and shape such that at least a portion of a cam 1034 having an interior surface 1036 and an exterior surface 1038 is disposed therein. In accordance with the embodiment of the disclosure illustrated in FIGS. 10-13 and as a non-limiting example, the cam 1034 is substantially C-shaped.

Extending outboard from at least a portion of the exterior surface 1038 of the cam 1034 is a cam arm 1040 having a first end portion 1042 and a second end portion 1044.

Figure 12:
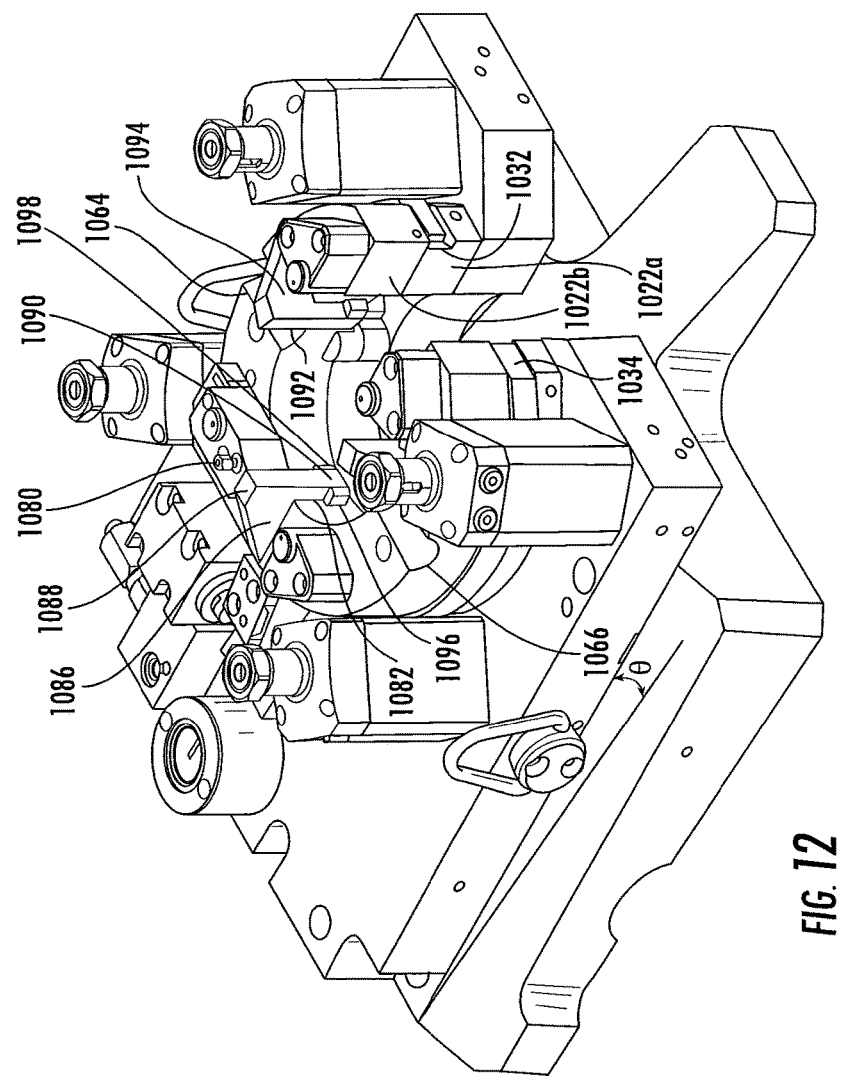
FIG. 12 is a schematic perspective-view of the mounting assembly illustrated in FIGS. 10 and 11 of the disclosure.

According to an embodiment of the disclosure, the work piece centering assembly 1022 may be made of two separate pieces a first work piece centering assembly portion 1022a and second work piece centering assembly portion 1022b. As illustrated in FIG. 12 of the disclosure, the work piece centering assembly 1022 are separated at the cam groove 1032 thereby allowing the cam 1034 to be inserted within the cam groove 1032 of the work piece centering assembly 1022. After the cam 1034 is inserted within the cam groove 1032, the second work piece centering assembly portion 1022b is integrally connected to the first work piece centering assembly portion 1022a. As a non-limiting example, the first work piece centering assembly portion 1022a is integrally connected to the second work piece centering assembly portion 1022b by using one or more welds and/or one or more mechanical fasteners.

Figure 10:
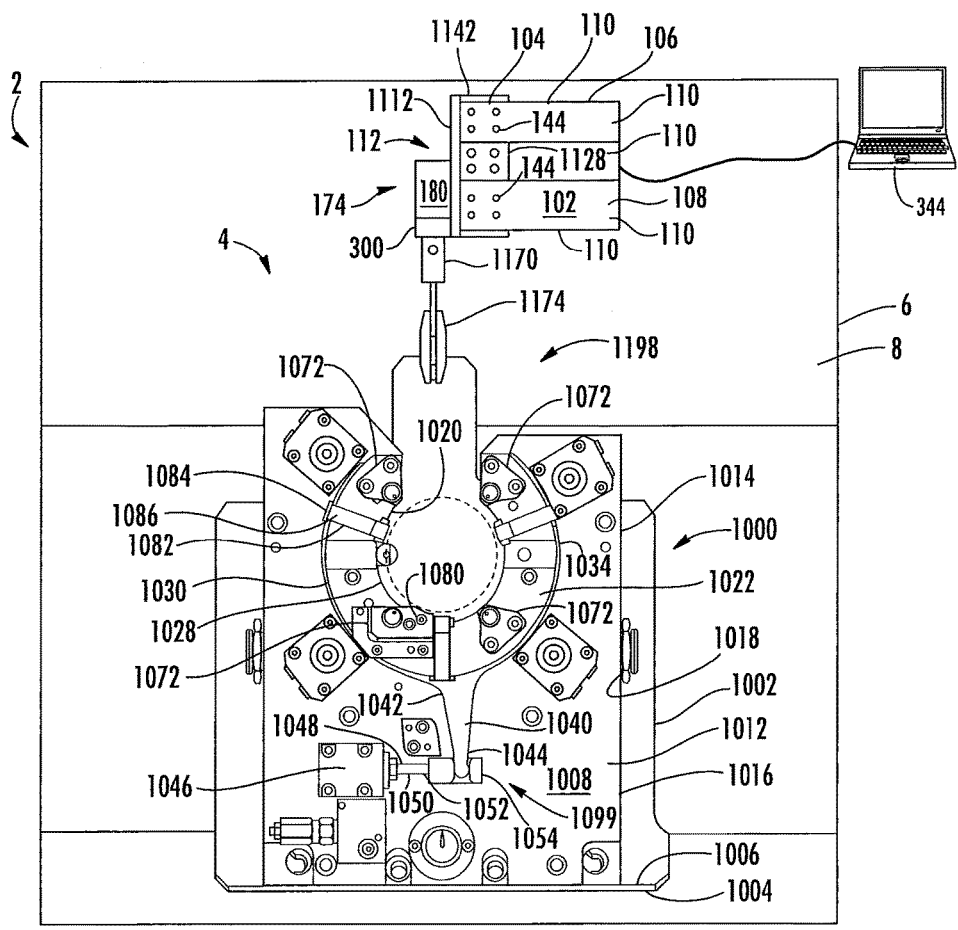
FIG. 10 is a schematic top-plan view of the apparatus according to an alternative embodiment of the disclosure where a mounting assembly is in a second position.
Figure 11:
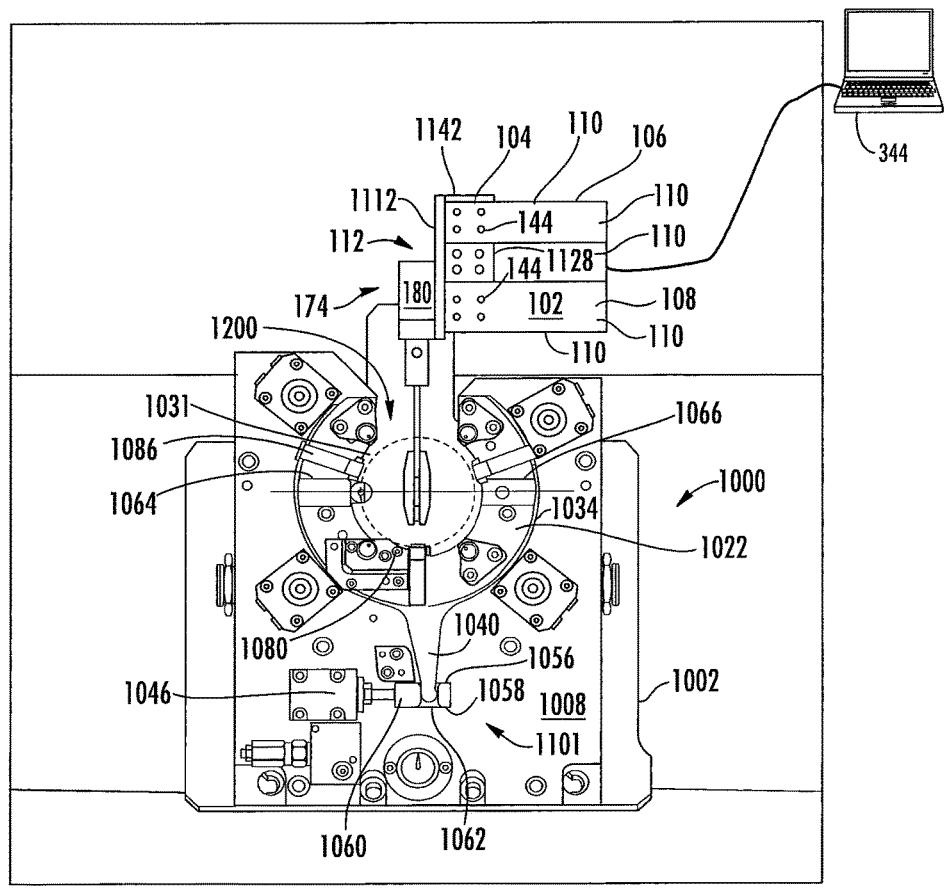
FIG. 11 is a schematic top-plan view of the apparatus illustrated in FIG. 10 where the mounting assembly is in a first position.

Integrally connected at the second end portion 1016 of the mounting portion 1008 of the mounting assembly 1000 is a hydraulic actuator 1046. The hydraulic actuator 1046 drives a shaft 1048 having a first end portion 1050 and a second end portion 1052. As illustrated in FIGS. 10 and 11 of the disclosure, a cam arm engagement portion 1054 having a first side 1056, a second side 1058 and an outer surface 1060. Extending from the first side 1056 to the second side 1058 of the outer surface 1060 of the can arm engagement portion 1054 is a cam arm groove 1062. In accordance with the embodiment of the disclosure illustrated in FIGS. 10 and 11, at least a portion of the second end portion of the second end portion 1044 of the cam arm 1040.

A first spindle groove 1064 and a second spindle groove 1066 extend from the interior surface 1028 to the exterior surface 1030 of the work piece centering assembly 1022 of the mounting assembly 1000. As illustrated in FIGS. 10-12 of the disclosure, the first and second grooves 1064 and 1066 are disposed on opposite sides of the work piece centering assembly 1022 of the mounting assembly 1000 and are aligned with one another. The shape of the first and second spindle grooves 1064 and 1066 are of a size and a shape that is complementary to the outer surfaces 1068 and 1070 of the first and second spindles 220 and 234 of the apparatus 2.

When the work piece 16 is disposed within the opening 1020 and/or the opening 1031 of the mounting assembly 1000, the one or more cross-pin openings 54 in the work piece 16 are aligned with the first and second spindle grooves 1064 and 1066 of the work piece centering assembly 1022.

Integrally connected to at least a portion of the outer surface 1026 of the work piece centering assembly 1022 is one or more work piece mounting blocks 1072 having an inner surface 1074 and an outer surface 1076. As a non-limiting example, at least a portion of the inner surface 1074 of the one or more work piece mounting blocks 1072 are integrally connected to at least a portion of the outer surface 1026 of the work piece centering assembly 1022 by using one or more welds, one or more mechanical fasteners and/or a dovetail connection. According to an alternative embodiment of the disclosure (not shown), the one or more work piece mounting blocks are integrally formed as part of the outer surface of the work piece centering assembly. When the work piece 16 is disposed within the opening 1020 and/or the opening 1031 of the mounting assembly 1000, at least a portion of a flange portion 1078 of the work piece 16 is in direct contact with at least a portion of the outer surface 1078 of the one or more work piece mounting blocks 1072. The flange portion 1078 extends from at least a portion of the outer surface 20 of the work piece 16.

One or more locator pins 1080 are integrally connected to at least a portion of the outer surface 1076 of the one or more work piece mounting blocks 1072. According to the embodiment of the disclosure illustrated in FIGS. 10-13 and as a non-limiting example, the one or more locator pins 1080 are one or more diamond pins. As a non-limiting example, at least a portion of the one or more locator pins 1080 are integrally connected to at least a portion of the outer surface 1076 of the one or more work piece mounting blocks 1072 by using one or more welds, a threaded connection and/or a press fit connection. In accordance with an alternative embodiment of the disclosure (not shown), at the one or more locator pins are integrally formed as part of the outer surface of the one or more work piece mounting blocks. When the work piece 16 is disposed within the opening 1020 and/or the opening 1031 of the mounting assembly 1000, at least a portion of the one or more locator pins 1080 are disposed within one or more mechanical fastener apertures 1081 in the flange portion 1078 of the work piece 16.

Extending from the outer surface 1026 of the work piece centering assembly 1022 is one or more work piece centering member openings 1082. As illustrated in FIGS. 10-13 of the disclosure, the one or more one or more work piece centering member openings 1082 are of a size and a shape that is complementary to the outer surface 1084 of one or more work piece centering members 1086. As illustrated in FIGS. 10-13 of the disclosure, the one or more work piece centering members 1086 have a first end portion 1088, a second end portion 1090, a first side 1092 and a second side 1094.

A first centering member retention portion 1096 extends from at least a portion of the first side 1092 of the one or more work piece centering members 1086. Additionally, a second centering member retention portion 1098 extends from at least a portion of the second side 1094 of the one or more work piece centering members 1086. The first and second centering member retention portions 1096 and 1098 allow the one or more work piece centering members 1086 to be slidingly engaged with and radially retained in the work piece centering assembly 1022.

At least a portion of the second end portion 1090 of the one or more work piece centering members 1086 is slidingly and drivingly engaged with at least a portion of the cam 1034. When the hydraulic actuator 1046 drives the cam arm engagement portion 1054 from a first position 1099 illustrated in FIG. 10 to a second position 1101 illustrated in FIG. 11, it drives the one or more work piece centering members 1086 linearly inboard the same distance toward the outer surface 20 of the work piece 16. As a result, the one or more work piece centering members 1086 allow the work piece 16 to be automatically or self-centered within the work piece centering assembly 1022. It is within the scope of this disclosure that the hydraulic actuator 1046 may be controlled by the programmable computer 344 thereby automating the centering process of the work piece 16 within the work piece centering assembly 1022.

Disposed outboard from the exterior surface 1038 of the cam 1034 is one or more clamping arm assemblies 1100 having an inner surface 1102 and an outer surface 1104. As a non-limiting example, at least a portion of the inner surface 1102 of the one or more clamping arm assemblies 1100 are integrally connected to at least a portion of the outer surface 1012 of the mounting portion 1008 by using one or more welds, one or more mechanical fasteners and/or a dovetail connection. In accordance with an alternative embodiment of the disclosure the one or more clamping arm assemblies 1100 are integrally formed as part of the outer surface 1012 of the mounting portion 1008 of the mounting assembly 1000.

Figure 13:
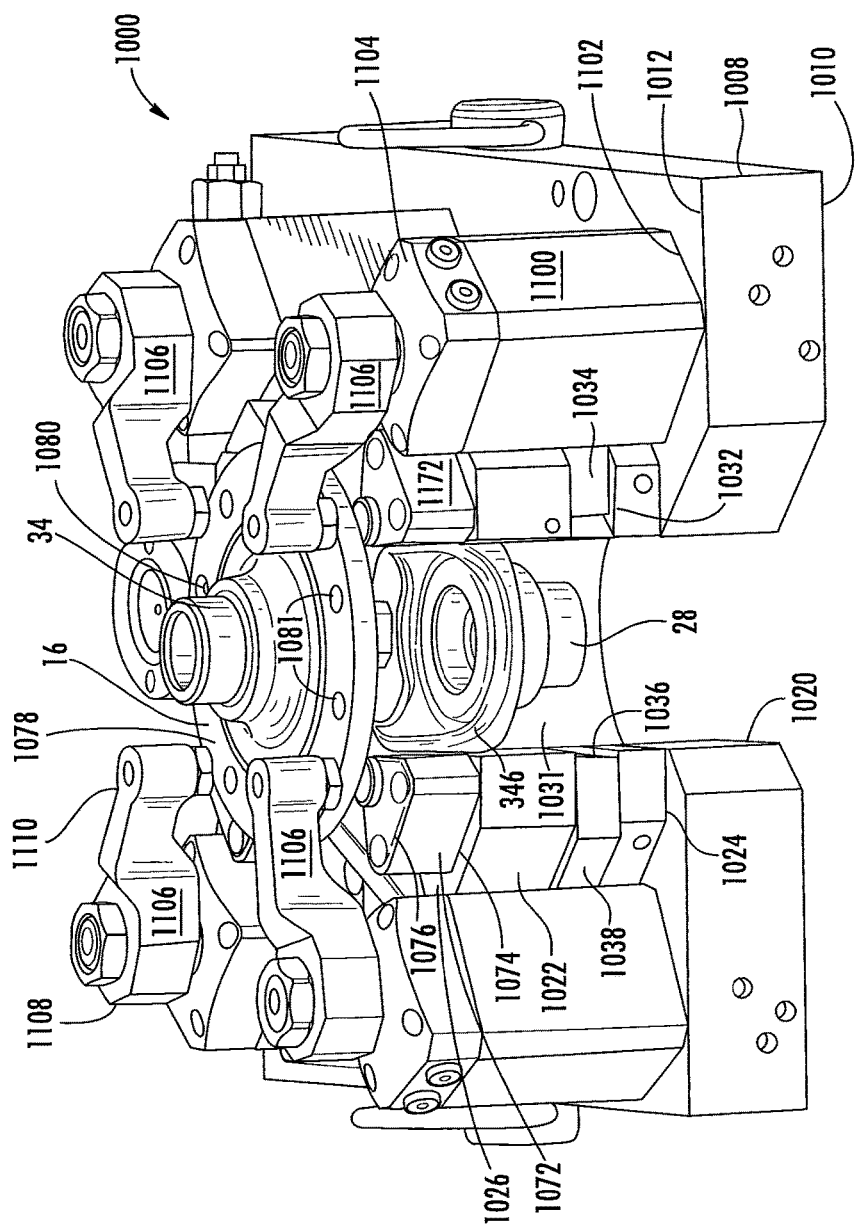
FIG. 13 is a schematic perspective-view of the mounting assembly illustrated in FIG. 12 with a work piece disposed therein.

Connected to at least a portion of the outer surface 1104 of the one or more clamping arm assemblies 1100 is one or more clamping arms 1106 having a first end portion 1108 and a second end portion 1110 that are fully articulable. At least a portion of the first end portion 1008 of the one or more clamping arms 1106 are connected to at least a portion of the outer surface 1104 of the one or more clamping arm assemblies 1100. As illustrated in FIG. 13 of the disclosure, when the work piece 16 is disposed within the mounting assembly 1000 at least a portion of the second end portion 1110 of the one or more clamping arms 1106 are in direct contact with at least a portion of the flange portion 1078 of the work piece 16. The one or more clamping arms 1106 radially retains the work piece 16 within the mounting assembly 1000 when the assembly 2 is in operation.

Figure 14:
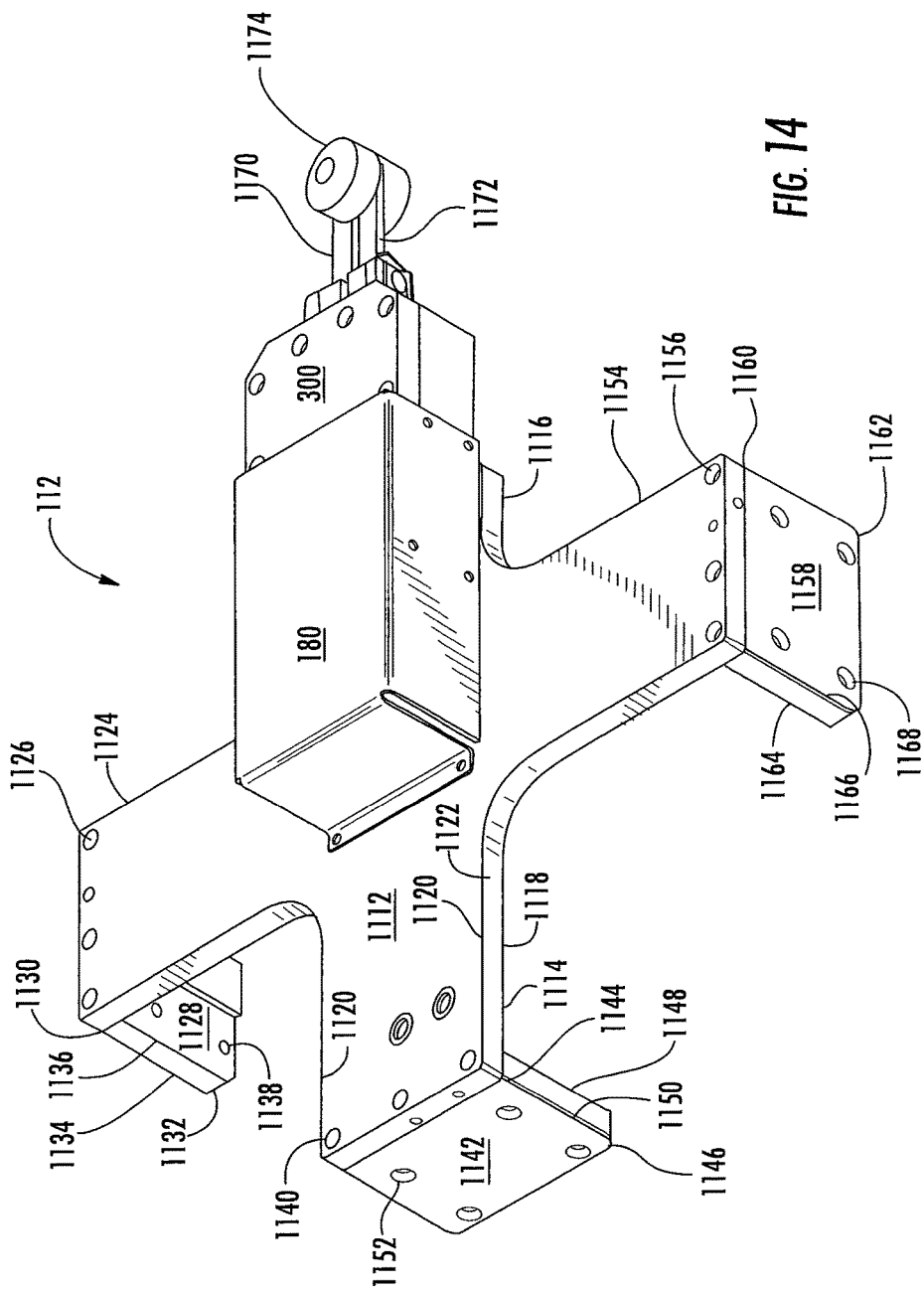
FIG. 14 is a schematic perspective-view of a cutter gripping assembly of the apparatus illustrated in FIGS. 10 and 11 according to an alternative embodiment of the disclosure.

As illustrated in FIG. 14 of the disclosure, the cutter gripping assembly 112 includes a turret-mounting member 1112 having a first end portion 1114, a second end portion 1116, an inboard surface 1118, an outboard surface 1120, a top surface 1122 and a bottom surface 1124. Extending from at least a portion of the top surface 1120 of the turret-mounting member 1112 is a first protruding portion 1124.

Extending from the inboard surface 1118 to the outboard surface 1120 of the first protruding portion 1124 is one or more attachment apertures 1126.

A first turret attachment member 1128 having a first end 1130, a second end 1132, an outboard surface 1134 and an inboard surface 1136 is integrally connected to at least a portion of the first protruding portion 1124 of the turret-mounting member 1112. Extending into the first turret attachment member 1128 from the first end 1130 is one or more mechanical fastener receiving portions (not shown). In order to connect the first end 1130 of the first turret attachment member 1128 to the inboard surface 1118 of the turret-mounting member 1112, one or more mechanical fasteners (not shown) extend through the one or more attachment apertures 1126 and into the one or more complementary mechanical fastener receiving portions (not shown). The one or more mechanical fasteners (not shown) are retained within the one or more mechanical fasteners (not shown) by using a threaded connection or a press-fit connection. It is within the scope of this disclosure that the first end 1130 of the first turret attachment member 1128 may be integrally connected to the inboard surface 1118 of the turret-mounting member 1112 by using one or more mechanical fasteners, one or more welds and/or a dovetail connection.

Extending from the outboard surface 1134 to the inboard surface 1136 of the first turret attachment member 1128 is one or more turret attachment apertures 1138. In order to connect the first turret attachment member 132 to one of the one or more substantially flat mounting surfaces 110 of the turret 102, one or more mechanical fasteners (not shown) extend through the one or more turret attachment apertures 1138 in the first turret attachment member 1128. At least a portion of the one or more mechanical fasteners (not shown) are the received and retained within the one or more mechanical fastener receiving portions 144 in the one or more substantially flat mounting surfaces 110 of the turret 102.

As illustrated in FIG. 14 of the disclosure, extending from the inboard surface 1118 to the outboard surface 1120 of the first end portion 1114 of the turret-mounting member 1112 is one or more attachment apertures 1140.

A second turret attachment member 1142 having a first end 1144, a second end 1146, an inboard surface 1148 and an outboard surface 1150 is integrally connected to at least a portion of the inboard surface 124 of the protruding portion 128 of the turret-mounting member 114. Extending into the second turret attachment member 1142 from the first end 1144 is one or more complementary mechanical fastener receiving portions (not shown). The one or more mechanical fasteners (not shown) are retained within the one or more mechanical fasteners (not shown) by using a threaded connection or a press-fit connection. In order to connect the first end 1144 of the second turret attachment member 1143 to the inboard surface 1118 of the turret-mounting member 1112, one or more mechanical fasteners (not shown) extend through the one or more attachment apertures 1140 and into the one or more complementary mechanical fastener receiving portions (not shown). It is within the scope of this disclosure that the first end 1144 of the second turret attachment member 1142 may be integrally connected to the inboard surface 1118 of the turret-mounting member 1112 by using one or more mechanical fasteners, one or more welds and/or a dovetail connection.

Extending from the outboard surface 1050 to the inboard surface 1048 of the second turret attachment member 1142 is one or more turret attachment apertures 1152. In order to connect the second turret attachment member 1142 to one of the one or more substantially flat mounting surfaces 110 of the turret 102, one or more mechanical fasteners (not shown) extend through the one or more turret attachment apertures 1152 in the second turret attachment member 1142. At least a portion of the one or more mechanical fasteners (not shown) are the received and retained within the one or more mechanical fastener receiving portions 144 in the one or more substantially flat mounting surfaces 110 of the turret 102.

Extending from at least a portion of the bottom surface 1122 of the turret-mounting member 1112 is a second protruding portion 1154. As illustrated in FIG. 14 of the disclosure, extending from the inboard surface 1118 to the outboard surface 1120 of the second protruding portion 1154 is one or more attachment apertures 1156.

A third turret attachment member 1158 having a first end 1160, a second end 1162, an inboard surface 1164 and an outboard surface 1166 is integrally connected to at least a portion of the inboard side 1118 of the second protruding portion 1154 of the turret-mounting member 1112. Extending into the third turret attachment member 1158 from the first end 1160 is one or more complementary mechanical fastener receiving portions (not shown). In order to connect the first end 1160 of the third turret attachment member 1158 to the inboard surface 1118 of the turret-mounting member 1112, one or more mechanical fasteners (not shown) extend through the one or more attachment apertures 1156 and into the one or more complementary mechanical fastener receiving portions (not shown). The one or more mechanical fasteners (not shown) are retained within the one or more mechanical fasteners (not shown) by using a threaded connection or a press-fit connection. It is within the scope of this disclosure that the first end 1160 of the third turret attachment member 1158 may be integrally connected to the inboard surface 1118 of the turret-mounting member 1112 by using one or more mechanical fasteners, one or more welds and/or a dovetail connection.

Extending from the outboard side 1166 to the inboard side 1164 of the third turret attachment member 1158 is one or more turret attachment apertures 1168. In order to connect the third turret attachment member 1158 to the one or more substantially flat mounting surfaces 110 of the turret 102, one or more mechanical fasteners (not shown) extend through the one or more turret attachment apertures 1168 in the third turret attachment member 1158. At least a portion of the one or more mechanical fasteners (not shown) are the received and retained within the one or more mechanical fastener receiving portions 144 in the one or more substantially flat mounting surfaces 110 of the turret 102.

In accordance with an alternative embodiment of the disclosure (not shown), the first turret attachment member 1128, the second turret attachment member 1142 and/or the third turret attachment member 1158 are integrally formed as part of the turret-mounting member 1112. As a result, the turret-mounting member 1112 is a single unitary structure.

Integrally connected to at least a portion of the outboard surface 1120 of the turret-mounting member 1112 is the gripping apparatus 174.

As illustrated in FIGS. 15 and 16 of the disclosure, the gripping apparatus 174 includes a first cutter gripper 1170 and a second cutter gripper 1172. The first and second cutter grippers 1170 and 1172 are used to grab a cutter 1174 having a substantially cylindrical intermediate portion 1176, a first side 1178, a second side 1180 and an outer surface 1182. The cutter is used to machine the inner surface 18 of the work piece 16.

Figure 17:
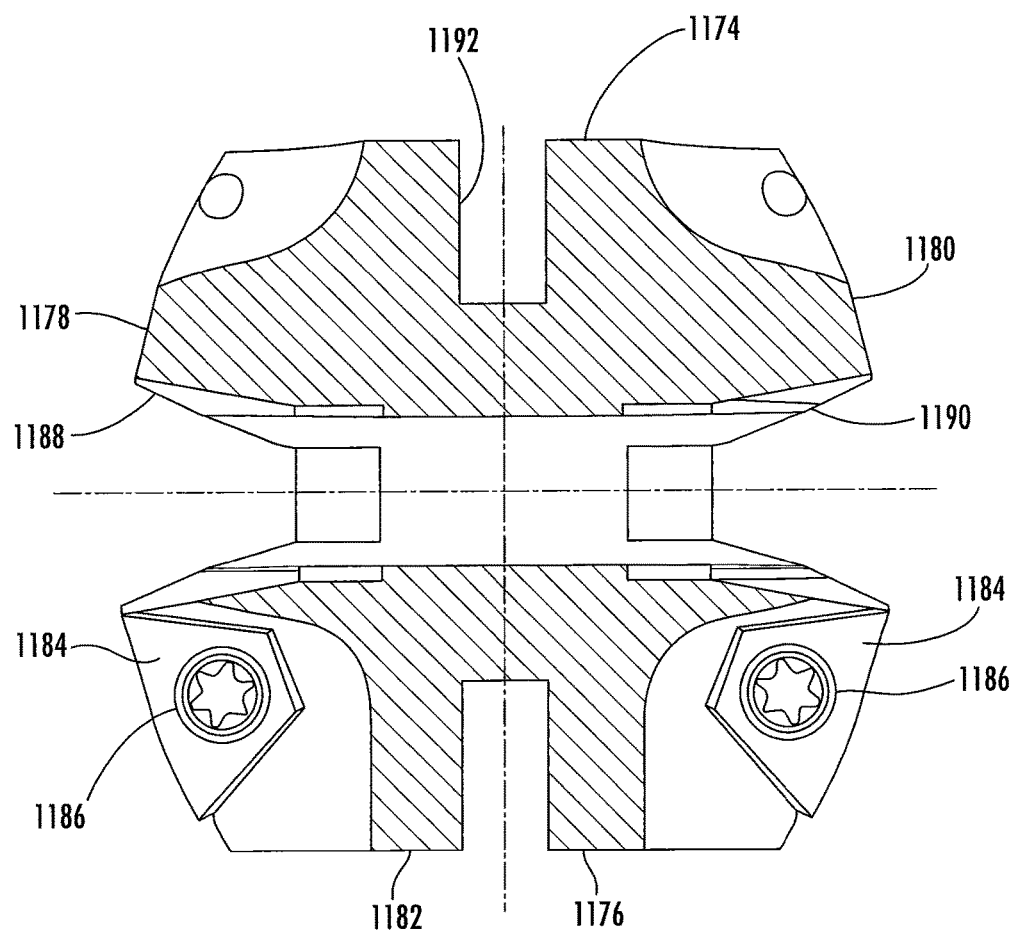
FIG. 17 is a schematic side-view of a cutter according to an alternative embodiment of the disclosure.

In accordance with the embodiment of the disclosure illustrated in FIG. 17, the first and second sides 1178 and 1180 are substantially arcuate I shape. Integrally connected to at least a portion of the outer surface 1182 of the first and second side 1178 and 1180 of the cutter 1174 is one or more cutting elements 1184. According to the embodiment of the disclosure illustrated in FIG. 17, the one or more cutting elements 1184 are integrally connected to the first and second sides 1178 and 1180 of the cutter 1174 by using one or more mechanical fasteners 1186. This allows the one or more cutting elements 1186 to be individually replaced as they wear down. In accordance with an alternative embodiment of the disclosure (not shown), the one or more cutting elements may be integrally formed as part of the first and second side of the cutter. According to this embodiment of the disclosure (not shown), when the one or more cutting elements on the cutter wear down, the entire cutter would be replaced. As a non-limiting example, the one or more cutting elements 1184 of the first and second sides 1178 and 1180 of the cutter 1174 define a substantially spherical cutting surface.

A first spindle-receiving portion 1188 extends from the outer surface 1182 of the first side 1178 of the cutter 1174 and into the substantially cylindrical portion 1176 of the cutter 1174. The first spindle-receiving portion 1188 has a size and a shape that is complementary to the first end portion 218 of the first spindle 220.

Extending from the outer surface 1182 of the second end portion 1180 of the cutter 1174 is a second spindle-receiving portion 1190. The second spindle-receiving portion 1190 of the cutter 1174 is of a size and shape that is complementary to the first end portion 232 of the second spindle 234.

Circumferentially extending along at least a portion of the outer surface 1182 of the substantially cylindrical intermediate portion 1176 of the cutter 1174 is a gripper groove 1192. The gripper groove 1192 is of a size and shape to receive at least a portion of the first and second cutter grippers 1170 and 1172.

The first and the second cutter grippers 1170 and 1172 are the same as the first and second cutter grippers 198 and 200 illustrated in FIGS. 3-6, except the gripping portions 254 and 268 are different. In accordance with the embodiment of the disclosure illustrated in FIGS. 15 and 16, the first cutter gripper 1170 has a gripper portion 1194 has a shape that is complementary to the outer surface 1182 of the gripper groove 1192 in the substantially cylindrical intermediate portion 1176 of the cutter 1174. Additionally, in accordance with this embodiment of the disclosure, the second cutter gripper 1172 has a gripper portion 1196 that is complementary to the outer surface 1182 of the gripper groove 1192 in the substantially cylindrical intermediate portion 1176 of the cutter 1174.

Figure 18:
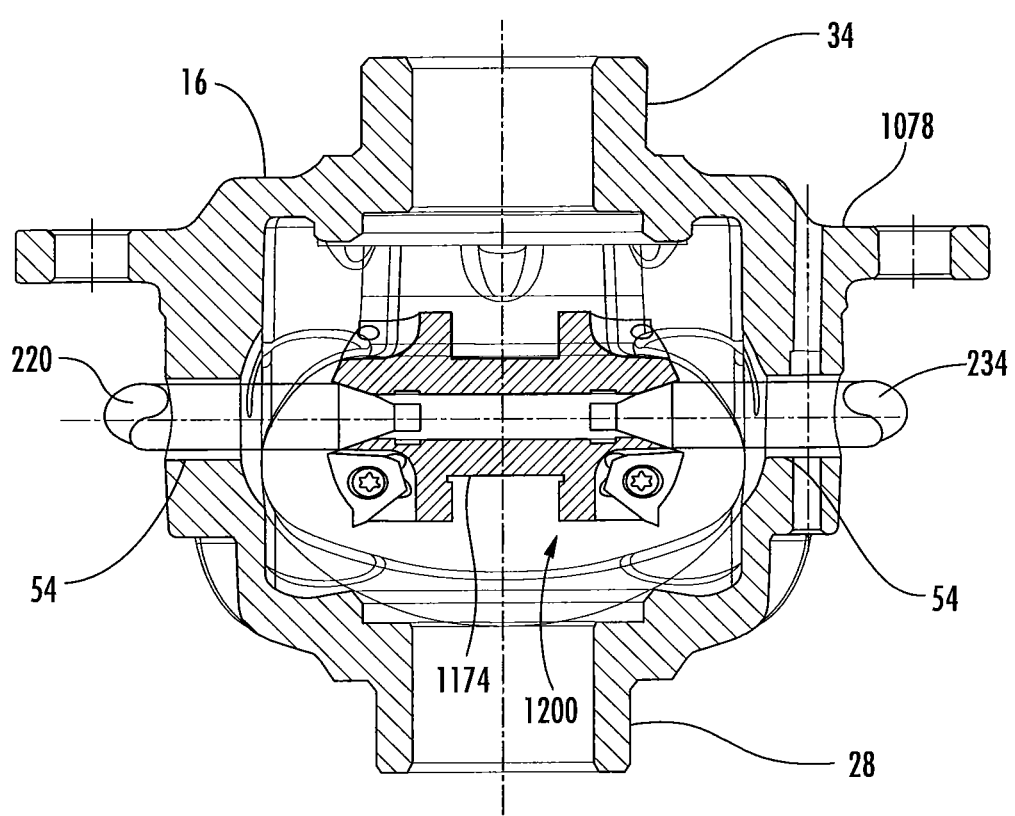
FIG. 18 is a cut-away schematic side-view of the cutter within the work piece illustrated in FIG. 13 where the cutter is in a first position.
Figure 19:
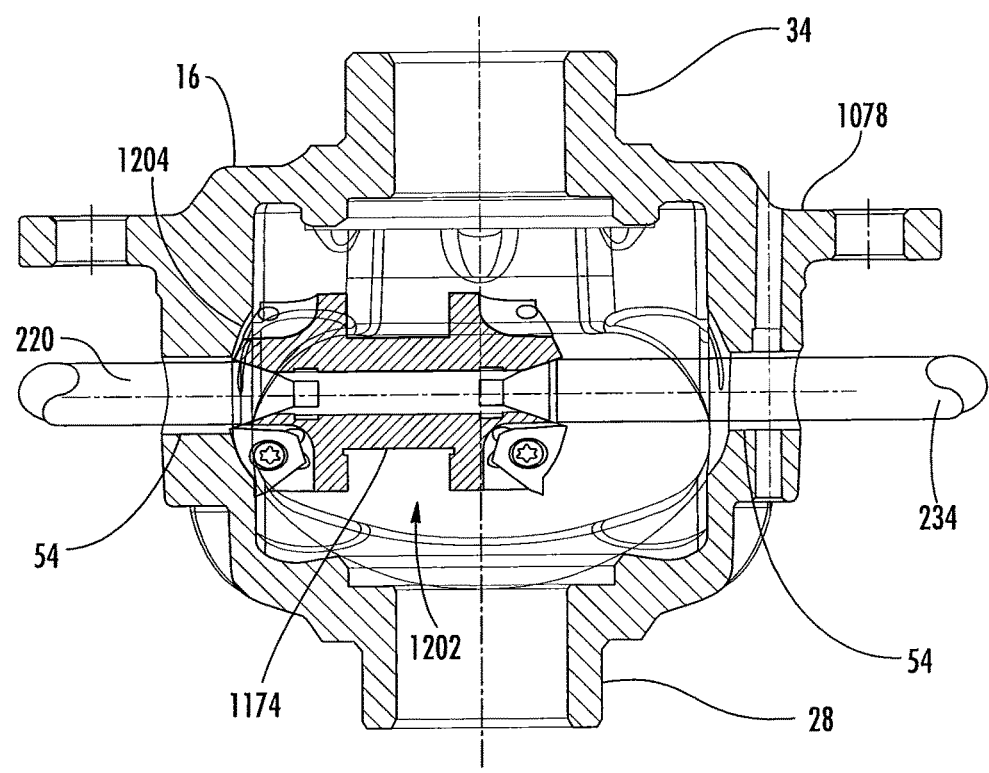
FIG. 19 is a cut-away schematic side-view of the cutter within the work piece illustrated in FIGS. 13 and 18 where the cutter is in a second position.
Figure 20:
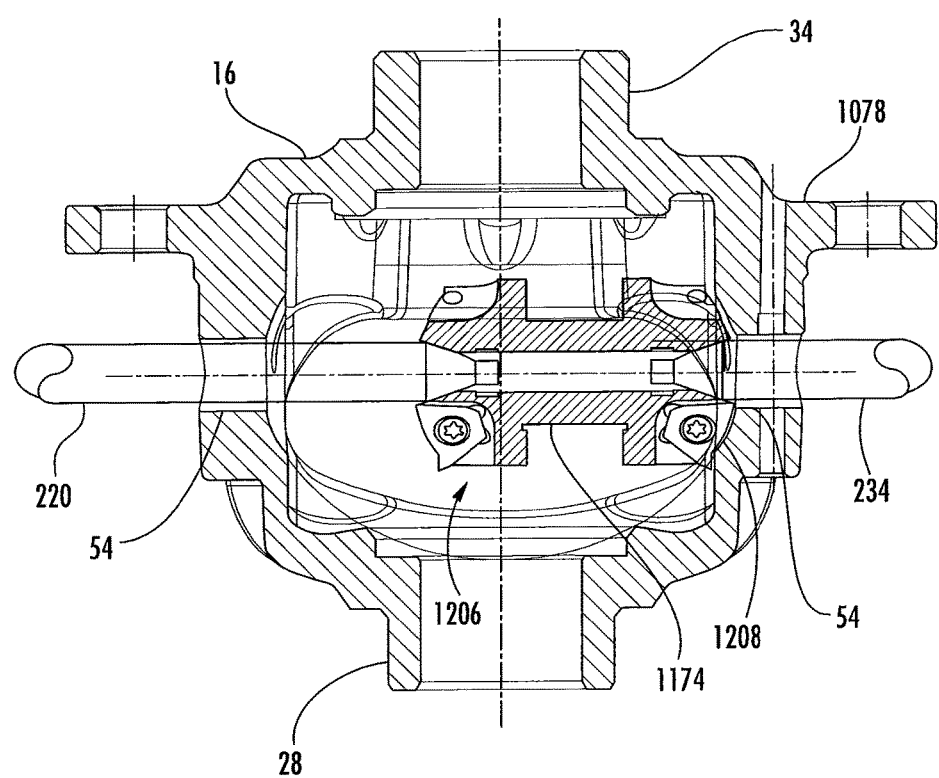
FIG. 20 is a cut-away schematic side-view of the cutter within the work piece illustrated in FIGS. 13, 18 and 19 where the cutter is in a third position.

Once the work piece 16 is centered within the work piece centering assembly 1022 and the cuter gripping assembly 112 is grippingly engaged with the cutter 1174, the cutter gripping assembly 112 is in a home position 1198. In order to begin machining the inner surface 18 of the work piece 16, the cutter gripping assembly 112 needs to transition from the home position 340 illustrated in FIG. 10 to a start position 1200 illustrated in FIG. 11. In response to a signal received from the programmable computer 344, the turret 102 is driven linearly from the home position 1198 to the start position 1200 inserting the cutter 1174 through a differential case window 346 and within the hollow portion 26 of the work piece 16. As illustrated in FIGS. 11 and 18 of the disclosure, when the cutter 1174 is in the start position 1200 within the hollow portion 26 of the work piece 16, the cutter 1174 is co-axial with the first spindle 220, the second spindle 234, the first spindle groove 1064 and the second spindle groove 1066.

According to an embodiment of the disclosure, the outer surface 1006 of the base portion 1002 of the mounting assembly 1000 is substantially parallel with the outer surface 8 of the tabletop 6 of the apparatus 2. However, in accordance with an alternative embodiment of the disclosure, the outer surface 1006 of the base portion 1002 of the mounting assembly 1000 is at an angle θ relative to the outer surface 8 of the tabletop 6 of the apparatus 2. As a non-limiting example, the angle θ is approximately 2 to 25 degrees. By angling the outer surface 1006 of the base portion 1002 of the mounting assembly 100, it provides the additional clearance necessary to insert the cutter 1174 into the hollow portion 26 of the work piece 16.

After the cutter 1174 is in the start position 1200, the programmable computer 244 instructs the first and second spindles 220 and 234 to be driven axially inboard through the one or more cross-pin openings 54 in the intermediate portion 23 of the work piece 16 and into the hollow portion 26 of the work piece 16. The first and second spindles 220 and 234 are driven axially inboard until they are received within the spindle attachment portions 1188 and 1190 of the cutter 1174 thereby drivingly connecting the cutter 1174 to the spindles 220 and 234.

Once the cutter 1174 is drivingly connected to the first and second spindles 220 and 234, the programmable computer 344 instructs the hydraulic cylinder 176 of the cutter gripping assembly 112 to extend the scissor pin 338 disengaging the first and second cutter grippers 1194 and 1196 from the cutter 1174. When the cutter gripping assembly 112 is grippingly disengaged from the cutter 1174, the programmable computer 344 then instructs the turret 102 to move linearly from the start position 1200 to the home position 1198 where no piece of the cutter gripping assembly 112 is located within the hollow portion 26 of the work piece 16.

The programmable computer 344 then instructs the first and second spindle 220 and 234 to rotate at the same speed thereby rotating the cutter 1174. Once the cutter 1174 is rotating at the desired speed, the programmable computer 344 then instructs the first spindle 220 to axially retract while the second spindle 234 axially extends at the same rate. This transitions the cutter 1174 from the start position 1200 to a first cutting position 1202 where the cutter 1174 machines a first internal machining surface 1204 of the work piece 16. As a non-limiting example, the first internal machining surface 1204 is a first differential spider gear surface.

When the a pre-determined amount of material has been removed from the first internal machining surface 1204, the programmable computer 344 instructs the first spindle 220 to axially extend at the same rate as the second spindle 234 axially retracts. This transitions the cutter 1174 from the first cutting position 1202 to a second cutting position 1206 where the cutter 1174 machines a second internal machining surface 1208 of the work piece 16. As a non-limiting example, the second internal machining surface 1208 is a second differential spider gear surface.

Once a pre-determined amount of material has been removed from the second internal machining surface 1208, the programmable computer 344 instructs the first spindle 220 to axially retract at the same rate as the second spindle 234 axially extends until the cutter 1174 is back in the start position 1200. When the cutter 1174 is in the start position 1200, the programmable computer 344 instructs the turret 102 to linearly move the cutter gripping assembly 112 from the home position 1198 to the start position 1200 and to engage the cutter 1174.

With the cutter gripping assembly 112 grippingly engaged with the cutter 1174, the first and second spindles 220 and 234 axially retract until the spindles 220 and 234 are no longer within the work piece 16. The work piece 16 is then be removed from the lathe assembly 4 and a new work piece (not shown) can be inserted to begin the process over again.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A method of machining an internal surface of a differential case, comprising the steps of:

providing a lathe comprising a tabletop, a programmable computer, a lathe turret, a first spindle and a second spindle, wherein said lathe turret, said first spindle and said second spindle are in communication with said programmable computer;

providing a cutter gripping assembly comprising a pair of scissor arms that are integrally connected to a pair of cutter grippers;

attaching said cutter gripping assembly to said lathe turret;

providing a differential case comprising a hollow portion, a first tubular portion on a first end portion of said differential case, a second tubular portion on a second end portion of said differential case, one or more cross-pin openings in an intermediate portion of said differential case and one or more differential case windows in said intermediate portion of said differential case, wherein said first and second tubular portions are aligned with one another;

providing a mount assembly comprising a first cradle, a locator-pin, a second cradle, a first clamping arm and a second clamping arm that are integrally connected to said tabletop of said lathe;

mounting said differential case horizontally within said mount assembly, wherein said first cradle and said first clamping arm are in direct contact with said first tubular portion of said differential case, wherein said second cradle and said second clamping arm are in direct contact with said second tubular portion of said differential case, and at least a portion of said locator-pin is disposed within one of said one or more cross-pin openings in said differential case;

instructing said pair of cutter grippers to open;

closing said pair of cutter grippers to grippingly engage a cutter within a gripper groove in an outer surface of said cutter;

inserting said cutter through one of said one or more differential case windows to a start position within said hollow portion of said differential case by instructing said lathe turret to move toward said differential case, wherein in said start position said cutter is aligned with said first spindle and said second spindle;

inserting said first spindle through said opening in said first tubular portion of said differential case until a first end portion of said first spindle is received with a spindle-receiving portion in a first side of said cutter;

inserting said second spindle through said opening in said second tubular portion of said differential case until a first end portion of said second spindle is received with a spindle-receiving portion in a second side of said cutter;

opening said pair of cutter to grippers to grippingly disengaging said cutter grippers from said cutter;

removing said cutter gripping assembly from within said hollow portion of said differential case by instructing said lathe turret to move away from said differential case;

instructing said first and second spindles to spin;

machining a first internal machining surface by retracting said first spindle at a same rate as said second spindle extends; and machining a second internal machining surface by extending said first spindle at a same rate as said second spindle retracts.

2. The method of machining an internal surface of a differential case of claim 1, wherein said first internal machining surface is a first differential side gear surface and wherein said second internal machining surface is a second differential side gear surface.

3. The method of machining an internal surface of a differential case of claim 1, further comprising the step of:
   returning said cutter to said start position;
   opening said pair of cutter grippers of said cutter gripping assembly;
   instructing said lathe turret to move toward said differential case to said start position;
   closing said pair of cutter grippers to grippingly engage said gripper groove in said outer surface of said cutter; and
   instructing said lathe turret to move away from said differential case until said cutter is no longer disposed within said hollow portion of said differential case.

4. An apparatus for machining an internal surface of a differential case, comprising:
   a lathe comprising a programmable computer, a lathe turret, a first spindle, a second spindle and a tabletop, wherein said lathe turret has an outer surface having one or more substantially flat mounting surfaces;
   a differential case having a first end portion, a second end portion, an intermediate portion, an inner surface and an outer surface;
      wherein said inner surface and said outer surface defines a hollow portion therein, wherein a first tubular portion extends axially outboard from said first end portion of said differential case, wherein a second tubular portion extends axially outboard from said second end portion of said differential case, wherein an output shaft opening in said first tubular portion of said differential case is aligned with an output shaft opening in said second tubular portion of said differential case, and wherein one or more cross-pin openings extend from said inner surface to said outer surface of said differential case;
   a first cradle, wherein at least a portion of an outer surface of said first cradle is in direct contact with at least a portion of said outer surface of said first tubular portion of said differential case;
   a second cradle, wherein at least a portion of an outer surface of said second cradle is in direct contact with at least a portion of said outer surface of said second tubular portion of said differential case;
   a locator-pin, wherein at least a portion of said locator-pin is disposed within one of said one or more cross-pin openings in said differential case;
   a first articulable clamping arm, wherein at least a portion of said first articulable clamping arm is in direct contact with at least a portion of said outer surface of said first tubular portion of said differential case;
   a second articulable clamping arm, wherein at least a portion of said second articulable clamping arm is in direct contact with at least a portion of said outer surface of said second tubular portion of said differential case;
   a turret-mounting member having a first end portion, a second end portion, a first turret attachment member, a second turret attachment member and a third turret attachment member;
      wherein at least a portion of said first turret attachment member, at least a portion of said second turret attachment member and at least a portion of said third turret attachment member is integrally connected to at least a portion of said one or more substantially flat mounting surfaces of said lathe turret;
   a gripping apparatus is integrally connected to at least a portion of said turret-mounting member;
      wherein said gripping apparatus further comprises a first scissor arm in driving engagement with said scissor pin, a second scissor arm in driving engagement with said scissor pin, a first dowel pin in rotating engagement with said first scissor arm, a second dowel pin in rotating engagement with said second scissor arm, a first cutter gripper integrally connected to an end of said first scissor arm opposite said scissor pin, and a second cutter gripper integrally connected to an end of said second scissor arm opposite said scissor pin;
   a cutter having an intermediate portion, a first side, a second side and an outer surface;
      wherein a first spindle attachment portion on said first side of said intermediate portion of said cutter has a spindle-receiving portion for receiving at least a portion of a first end portion of said first spindle;
      wherein a second spindle attachment portion on said second side of said intermediate portion of said cutter has a spindle-receiving portion for receiving at least a portion of a first end portion of said second spindle; and
      wherein a gripper groove circumferentially extends along at least a portion of said outer surface of said intermediate portion of said cutter, and wherein said gripper groove is of a size and shape to receive an end of said first and second cutter grippers opposite said first and second scissor arms.

5. The apparatus for machining an internal surface of a differential case of claim 4, wherein said turret-mounting member is substantially T-shaped.

6. The apparatus for machining an internal surface of a differential case of claim 4, wherein said lathe turret has a first position and a second position;
   wherein in said first position, said first and second cutter grippers are grippingly engaged with said cutter at a point outside said differential case; and
   wherein in said second position, said lathe turret moves toward said differential case until said cutter is disposed within said hollow portion of said differential case and is aligned with said first spindle and said second spindle.

7. The apparatus for machining an internal surface of a differential case of claim 6, wherein said cutter has a start position, a first cutting position and a second cutting position;
   wherein in said start position, said cutter is disposed within said hollow portion of said differential case, at least a portion of said first end portion of said first spindle is received within said spindle-receiving portion of said first side of said cutter drivingly connecting said first spindle to said cutter, and at least a portion of said first end portion of said second spindle is received within said spindle-receiving portion of said second side of said cutter drivingly connecting said second spindle to said cutter;
   wherein in said first cutting position, said first spindle is retracted and said second spindle is extended until said first side of said cutter is in direct contact with a first internal machining surface; and
   wherein in said second cutting position, said first spindle is extended and said second spindle is retracted until said second side of said cutter is in direct contact with a second internal machining surface.

8. The apparatus for machining an internal surface of a differential case of claim 7, wherein said first internal machining surface is a first differential side gear surface and said second internal machining surface is a second differential side gear surface.

9. The apparatus for machining an internal surface of a differential case of claim 4, wherein said ends of said first and second dowel pins are supported within dowel pin mount apertures in a dowel pin mount.

10. A method of machining an internal surface of a differential case, comprising the steps of:
providing a lathe comprising a tabletop, a programmable computer, a lathe turret, a first spindle and a second spindle, wherein said lathe turret, said first spindle and said second spindle are in communication with said programmable computer;
providing a cutter gripping assembly comprising a pair of scissor arms that are integrally connected to a pair of cutter grippers;
attaching said cutter gripping assembly to said lathe turret;
providing a differential case comprising a flange portion, a first cross-pin opening in an intermediate portion of said differential case, second cross-pin opening in an intermediate portion of said differential case and one or more differential case windows in said intermediate portion of said differential case, wherein said first and second cross-pin openings are aligned within one another;
providing a mount assembly comprising a base portion, a mounting portion, a work piece centering assembly, one or more mounting blocks, one or more locator pins, a cam, one or more work piece centering members, one or more articulable clamping arms and an actuator, wherein an inner surface of said one or more mounting blocks are integrally connected to an outer surface of said work piece centering assembly, wherein said one or more locator pins are integrally connected to at least a portion of an outer surface of said one or more mounting blocks, wherein said cam is disposed within a cam groove in an exterior surface of said work piece centering assembly, wherein said one or more work piece centering members are slidingly and drivingly engaged with said cam, wherein said one or more work piece centering members are slidingly engaged with said work piece centering assembly, wherein a cam arm extends outboard from said cam;
mounting said differential case vertically within said mount assembly, wherein at least a portion of said differential is received within an opening in said work piece centering assembly, wherein at least a portion of said one or more locator pins are received within one or more mechanical fastener apertures in said flange portion of said differential case, wherein at least a portion of said flange portion is in direct contact with said outer surface of said one or more mounting blocks, wherein at least a portion of said one or more articulable clamping arms are in direct contact with at least a portion of said flange portion of said differential case;
instructing said pair of cutter grippers to open;
closing said pair of cutter grippers to grippingly engage said cutter;
inserting said cutter through one of said one or more differential case windows to a start position within said hollow portion of said differential case by instructing said lathe turret to move toward said differential case, wherein in said start position said cutter is aligned with said first spindle and said second spindle;
inserting said first spindle through said first cross-pin opening of said differential case until a first end portion of said first spindle is received within a spindle-receiving portion in a first side of said cutter;
inserting said second spindle through said second cross-pin opening of said differential case until a first end portion of said second spindle is received within a spindle-receiving portion in a second side of said cutter;
opening said pair of cutter grippers to grippingly disengaging said cutter;
removing said cutter gripping assembly from within said hollow portion of said differential case by instructing said lathe turret to move away from said differential case;
instructing said first and second spindles to spin;
machining a first internal machining surface by retracting said first spindle at a same rate as said second spindle extends; and
machining a second internal machining surface by extending said first spindle at a same rate as said second spindle retracts.

11. The method of machining an internal surface of a differential case of claim 10, wherein said first internal machining surface is a first differential spider gear surface, and wherein said second internal machining surface is a second differential spider gear surface.

12. The method of machining an internal surface of a differential case of claim 10, further comprising the steps of:
returning said cutter to said start position;
opening said pair of cutter grippers of said cutter gripping assembly;
instructing said lathe turret to move toward said differential case to said start position;
closing said pair of cutter grippers to grippingly engage with said cutter; and
instructing said lathe turret to move away from said differential case until said cutter is no longer disposed within said hollow portion of said differential case.

13. The method of machining an internal surface of a differential case of claim 10, wherein said one or more locator pins are one or more diamond pins.

14. An apparatus for machining an internal surface of a differential case, comprising:
a lathe comprising a programmable computer, a lathe turret, a first spindle, a second spindle and a tabletop, wherein said lathe turret has an outer surface having one or more substantially flat mounting surfaces;
a mounting assembly comprising a base portion, mounting portion, a work piece centering assembly, a cam, one or more work piece centering members, one or more mounting blocks, one or more locator pins, one or more articulable clamping arms and an actuator;
wherein at least a portion of an inner surface of said mounting portion is integrally connected to at least a portion of said base portion, wherein at least a portion of an inner surface of said work piece centering assembly is integrally connected to at least a portion an outer surface of said mounting portion, wherein a cam groove extends circumferentially along at least a portion of an exterior surface of said work piece centering assembly, wherein at least a portion of said cam is disposed within said cam groove, wherein said one or more work piece centering members are slidingly engaged with said work piece centering assembly within one or more work piece centering member openings, wherein said one or more work piece centering members are slidingly and drivingly engaged with said cam, wherein a cam arm extends outboard from at least a portion of said cam, wherein said actuator is in driving engagement with an end of said cam arm opposite said cam, wherein at least a portion of an inner surface of said one or more mounting blocks are integrally connected to at least a portion of said outer surface of said work piece centering assembly, wherein said one or more locator pins are integrally connected to at least a portion of said one or more mounting blocks, wherein said one or more articulable clamping arms are integrally connected to at least a portion of said mounting portion outboard from said work piece centering assembly;

a differential case having a first end portion, a second end portion, an intermediate portion, an inner surface and an outer surface;
  wherein said inner surface and said outer surface defines a hollow portion therein, wherein a first cross-pin opening extends from said inner surface to said outer surface of said intermediate portion of said differential case, wherein a second cross-pin opening extends from said inner surface to said outer surface of said intermediate portion of said differential case, wherein a flange portion circumferentially extends from at least a portion of said outer surface of said differential case, wherein said flange portion has one or more mechanical fastener apertures, wherein at least a portion of said differential case is received within an opening in said work piece centering assembly, wherein at least a portion of said one or more locator pins are located within said one or more mechanical fastener apertures in said flange portion, wherein at least a portion of said flange portion is in direct contact with said outer surface of said one or more mounting blocks, wherein said one or more articulable clamping arms are in direct contact with said flange portion of said differential case;

a turret-mounting member having a first end portion, a second end portion, a first turret attachment member, a second turret mounting member and a third turret mounting member;
  wherein at least a portion of said first turret mounting member, at least a portion of said second turret mounting member and at least a portion of said third turret mounting member is integrally connected to at least a portion of said one or more substantially flat mounting surfaces of said lathe turret;

a gripping apparatus is integrally connected to at least a portion of said turret-mounting member;
  wherein said gripping apparatus in driving engagement with a scissor pin, wherein said gripping apparatus further comprises a first scissor arm in driving engagement with said scissor pin, a second scissor arm in driving engagement with said scissor pin, a first dowel pin in rotating engagement with said first scissor arm, a second dowel pin in rotating engagement with said second scissor arm, a first cutter gripper integrally connected to an end of said first scissor arm opposite said scissor pin and a second cutter gripper integrally connected to an end of said second scissor arm opposite said scissor pin;

a cutter having an intermediate portion, a first side, a second side and an outer surface;
  wherein said first side of said cutter has a spindle-receiving portion for receiving at least a portion of a first end portion of said first spindle;
  wherein said second side of said cutter has a spindle-receiving portion for receiving at least a portion of a first end portion of second first spindle; and
  wherein a gripper groove circumferentially extends along at least a portion of said outer surface of said intermediate portion of said cutter and wherein said gripper groove is of a size and shape to receive at least a portion of an end of said first and second cutter grippers opposite said first and second scissor arms.

15. The apparatus for machining an internal surface of a differential case of claim 14, wherein said one or more locator pins are one or more diamond pins.

16. The apparatus for machining an internal surface of a differential case of claim 14, wherein said lathe turret has a first position and a second position;
  wherein in said first position, said first and second cutter grippers are grippingly engaged with said cutter at a point outside said differential case; and
  wherein in said second position, said lathe turret is moves linearly toward said differential case until said cutter is disposed within said hollow portion of said differential case and aligned with said first spindle and said second spindle.

17. The apparatus for machining an internal surface of a differential case of claim 16, wherein said cutter has a start position, a first cutting position and a second cutting position;
  wherein in said start position, said cutter is disposed within said hollow portion of said differential case, at least a portion of said first end portion of said first spindle is received within said spindle-receiving portion of said first side of said cutter drivingly connecting said first spindle to said cutter, and at least a portion of said first end portion of said second spindle is received within said spindle-receiving portion of said second side of said cutter drivingly connecting said second spindle to said cutter;
  wherein in said first cutting position, said first spindle is retracted and said second spindle is extended until said first side of said cutter is in direct contact with a first internal machining surface; and
  wherein in said second cutting position, said first spindle is extended and said second spindle is retracted until said second side of said cutter is in direct contact with a second internal machining surface.

18. The apparatus for machining an internal surface of a differential case of claim 17, wherein said first internal machining surface is a first differential spider gear surface and said second internal machining surface is a second differential spider gear surface.

19. The apparatus for machining an internal surface of a differential case of claim 14, wherein said ends of said first and second dowel pins are supported within dowel pin mount apertures in a dowel pin mount.

20. The apparatus for machining an internal surface of a differential case of claim 14, wherein said cam arm of said cam has a first position and a second position;
  wherein in said first position said one or more work piece centering members are not in contact with an outer surface of said differential case; and wherein in said second position said actuator retracts rotating said cam and driving said one or more work piece centering members inboard until at least a portion of said one or more work piece centering members is in direct contact with at least a portion of an outer surface of said differential case.

21. The apparatus for machining an internal surface of a differential case of claim 14, wherein said outer surface of said base portion is inclined at an angle θ relative to said outer surface of said tabletop and wherein said angle θ is approximately 2 to 25 degrees.

22. The method of machining an internal surface of a differential case of claim 10, wherein said work piece centering assembly has a substantially C-shape and said cam has a substantially C-shape.

23. The apparatus for machining an internal surface of a differential case of claim 14, wherein said work piece centering assembly has a substantially C-shape and said cam has a substantially C-shape.

\* \* \* \* \*